(12) United States Patent
Katukam et al.

(10) Patent No.: US 11,368,426 B1
(45) Date of Patent: *Jun. 21, 2022

(54) METHODS AND SYSTEMS OF AUTOMATIC NETWORK SERVICE INITIATION USING A NETWORK SERVICE SERVER

(71) Applicant: Nile Global, Inc., Cupertino, CA (US)

(72) Inventors: Suresh Katukam, Milpitas, CA (US); Promode Nedungadi, San Jose, CA (US); Vijay Bollapragada, Bangalore (IN); Avoy Nanda, Dublin, CA (US); Venu Hemige, San Ramon, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,054

(22) Filed: Dec. 24, 2020

(51) Int. Cl.
*H04L 61/5014* (2022.01)
*H04L 61/5053* (2022.01)
*H04L 61/5061* (2022.01)
*H04L 61/4511* (2022.01)

(52) U.S. Cl.
CPC ...... *H04L 61/2015* (2013.01); *H04L 61/1511* (2013.01); *H04L 61/2053* (2013.01); *H04L 61/2061* (2013.01)

(58) Field of Classification Search
CPC ............ H04L 61/2015; H04L 61/1511; H04L 61/2053; H04L 61/2061; H04L 61/2007; H04L 61/20; H04L 61/2076; H04L 41/08; H04L 41/0803; H04L 41/0806; H04W 40/24
See application file for complete search history.

(56) References Cited

U.S. PATENT DOCUMENTS

| 6,856,602 B1* | 2/2005 | Westberg | H04L 45/02 370/254 |
| 7,051,087 B1* | 5/2006 | Bahl | H04L 29/1232 709/220 |
| 7,310,663 B2* | 12/2007 | Bellinger | G06F 9/4411 709/220 |
| 8,018,876 B2* | 9/2011 | Johri | H04L 45/12 370/255 |
| 8,750,137 B2* | 6/2014 | Wall | H04L 12/56 370/248 |

(Continued)

OTHER PUBLICATIONS

RouterSwitch, Network Design with Examples-Core and Distribution, Apr. 21, 2014, https://blog.router-switch.com/2014/04/network-design-with-examples-core-and-distribution/ (Year: 2014).*

*Primary Examiner* — Hitesh Patel
*Assistant Examiner* — Vinh Nguyen
(74) *Attorney, Agent, or Firm* — Loza & Loza, LLP

(57) ABSTRACT

Embodiments of a device and method are disclosed. In an embodiment, a method of automatic network service initiation involves obtaining, from a network service server at a first network device of a network service block (NSB), network address information using a network service client at a second network device of the NSB that is connected with the first network device, at the second network device of the NSB, obtaining network service configuration information based on the network address information, and, performing automatic network service initiation of the second network device of the NSB based on the network service configuration information.

12 Claims, 18 Drawing Sheets

(56) References Cited

U.S. PATENT DOCUMENTS

| | | |
|---|---|---|
| 8,887,262 B1 | 11/2014 | Turner et al. |
| 9,173,115 B2 | 10/2015 | Sundareswaran et al. |
| 9,729,400 B2* | 8/2017 | Li .................. H04L 41/12 |
| 9,743,367 B2* | 8/2017 | Das .................. H04L 41/12 |
| 9,769,734 B2 | 9/2017 | Goto |
| 10,749,736 B2* | 8/2020 | Casado ............. H04L 41/082 |
| 11,223,597 B2* | 1/2022 | Ding ............. H04L 61/6022 |
| 2007/0268516 A1* | 11/2007 | Bugwadia ......... H04L 41/0886 |
| | | 358/1.15 |
| 2009/0077206 A1* | 3/2009 | Dunn ............ H04L 41/0806 |
| | | 709/220 |
| 2009/0296697 A1* | 12/2009 | Reilly ............. H04L 49/552 |
| | | 370/357 |
| 2010/0180016 A1* | 7/2010 | Bugwadia ......... H04W 24/02 |
| | | 709/220 |
| 2010/0277309 A1* | 11/2010 | Anderson ........... G08B 21/22 |
| | | 340/539.13 |
| 2013/0046865 A1* | 2/2013 | Liu .................. H04L 41/12 |
| | | 709/220 |
| 2013/0217332 A1* | 8/2013 | Altman .............. H04W 4/025 |
| | | 455/41.2 |
| 2014/0278281 A1 | 9/2014 | Vaynriber et al. |
| 2015/0063161 A1* | 3/2015 | Homma ............. H04W 24/02 |
| | | 370/254 |
| 2015/0172118 A1 | 6/2015 | Lin |
| 2016/0119183 A1* | 4/2016 | Gopalarathnam ...... H04L 41/30 |
| | | 370/254 |
| 2016/0191308 A1* | 6/2016 | Berry ............. H04L 41/0886 |
| | | 709/221 |
| 2017/0033983 A1* | 2/2017 | Caldwell ............ H04W 4/80 |
| 2017/0374560 A1* | 12/2017 | Judge .............. H04L 41/145 |
| 2018/0120973 A1 | 5/2018 | Tiwari et al. |
| 2019/0190782 A1* | 6/2019 | Panje ............. H04L 63/083 |
| 2020/0213191 A1* | 7/2020 | Watsen ........... H04L 41/0806 |
| 2021/0029169 A1* | 1/2021 | Bouvet ........... H04L 63/0254 |
| 2021/0044498 A1* | 2/2021 | Mercian .......... H04L 63/1425 |
| 2021/0184930 A1* | 6/2021 | Mutnuru ............ H04L 41/12 |

* cited by examiner

METHODS AND SYSTEMS OF AUTOMATIC NETWORK SERVICE INITIATION USING A NETWORK SERVICE SERVER

BACKGROUND

Network deployment, for example, enterprise network deployment, at a customer site typically involves a manual and lengthy process, which can take several weeks to months. For example, network deployment typically involves multiple time consuming and error-prone steps, such as gathering requirements, network design, network implementation, network operation, and network optimization, which are manually performed by network experts (e.g., network administrators). Network implementation usually includes physically racking and stacking of network devices, connecting the network devices according to a planned network topology and manually configuring the network devices and initiating network services for the network devices by a network expert (e.g., a network administrator). However, manually configuring network devices and initiating network services for the network devices is both time consuming and error-prone. In addition, getting a network expert (e.g., a network administrator) on-site requires additional time, which can prolong the network deployment process. At some customer sites (e.g., small offices and branches), it may be hard to find a network expert (e.g., a network administrator) to perform network device configuration functions. Therefore, there is a need for network implementation technology that can automatically initiate network services for network devices once the network devices are physically racked and connected according to a network topology.

SUMMARY

Embodiments of a device and method are disclosed. In an embodiment, a method of automatic network service initiation involves obtaining, from a network service server at a first network device of a network service block (NSB), network address information using a network service client at a second network device of the NSB that is connected with the first network device, at the second network device of the NSB, obtaining network service configuration information based on the network address information, and, performing automatic network service initiation of the second network device of the NSB based on the network service configuration information. Other embodiments are also described.

In an embodiment, the network address information includes a network address that is assigned to the second network device by the network service server at the first network device.

In an embodiment. the network service server includes a dynamic host configuration protocol (DHCP) server, and the network service client includes a DHCP client.

In an embodiment, the network address information includes an Internet Protocol (IP) address that is assigned to the DHCP client by the DHCP server.

In an embodiment, the network address information includes address information of a cloud server, and at the second network device of the NSB, obtaining the network service configuration information based on the network address information includes obtaining the network service configuration information from the cloud server based on the address information of the cloud server.

In an embodiment, the network address information further includes an IP address of a domain name system (DNS) server.

In an embodiment, performing automatic network service initiation of the second network device of the NSB based on the network service configuration information includes performing automatic network service initiation of an open shortest path first (OSPF) service or a link layer discovery protocol (LLDP) service in the second network device of the NSB based on the network service configuration information.

In an embodiment, the first network device of the NSB includes a distribution switch.

In an embodiment, the second network device of the NSB includes a gateway, an access switch, a wireless access point, or a sensor.

In an embodiment, the NSB includes a pair of distribution switches, a pair of gateways that are connected to the pair of distribution switches, access switches that are connected to the pair of gateways, wireless access points (APs) that are connected to the access switches, and wireless sensors that wirelessly connect to the wireless APs.

In an embodiment, a method of automatic network service initiation involves performing automatic network service initiation of a first network device of an NSB to activate a network service server at the first network device, at the network service server at the first network device, receiving a request for network address information from a network service client at a second network device of the NSB that is connected with the first network device, and transmitting the network address information from the network service server at the first network device to the network service client at the second network device, where automatic network service initiation of the second network device of the NSB is performed based on the network address information.

In an embodiment, the network service server includes a DHCP server, and wherein the network service client includes a DHCP client.

In an embodiment, the network address information includes an IP address that is assigned to the DHCP client by the DHCP server.

In an embodiment, performing automatic network service initiation of the first network device of the NSB includes performing automatic network service initiation of a DHCP service, an OSPF service, and an LLDP service in the first network device of the NSB.

In an embodiment, the method further includes pairing the first network device of the NSB with an installer device at a customer site to obtain first network service configuration information from the installer device.

In an embodiment, performing automatic network service initiation of the first network device of the NSB to activate the network service server at the first network device includes performing automatic network service initiation of the first network device of the NSB to activate the network service server at the first network device based on the first network service configuration information from the installer device.

In an embodiment, a method of automatic network service initiation involves performing automatic network service initiation of a first network device of an NSB to activate a network service server at the first network device, obtaining, from the network service server at the first network device, network address information using a network service client at a second network device of the NSB that is connected with the first network device, at the second network device of the NSB, obtaining network service configuration information based on the network address information, and performing automatic network service initiation of the second network device of the NSB based on the network service configuration information.

In an embodiment, the network service server includes a DHCP server, and the network service client includes a DHCP client.

In an embodiment, the network address information includes an IP address that is assigned to the DHCP client by the DHCP server.

In an embodiment, performing automatic network service initiation of the second network device of the NSB based on the network service configuration information includes performing automatic network service initiation of an OSPF service or an LLDP service in the second network device of the NSB based on the network service configuration information.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
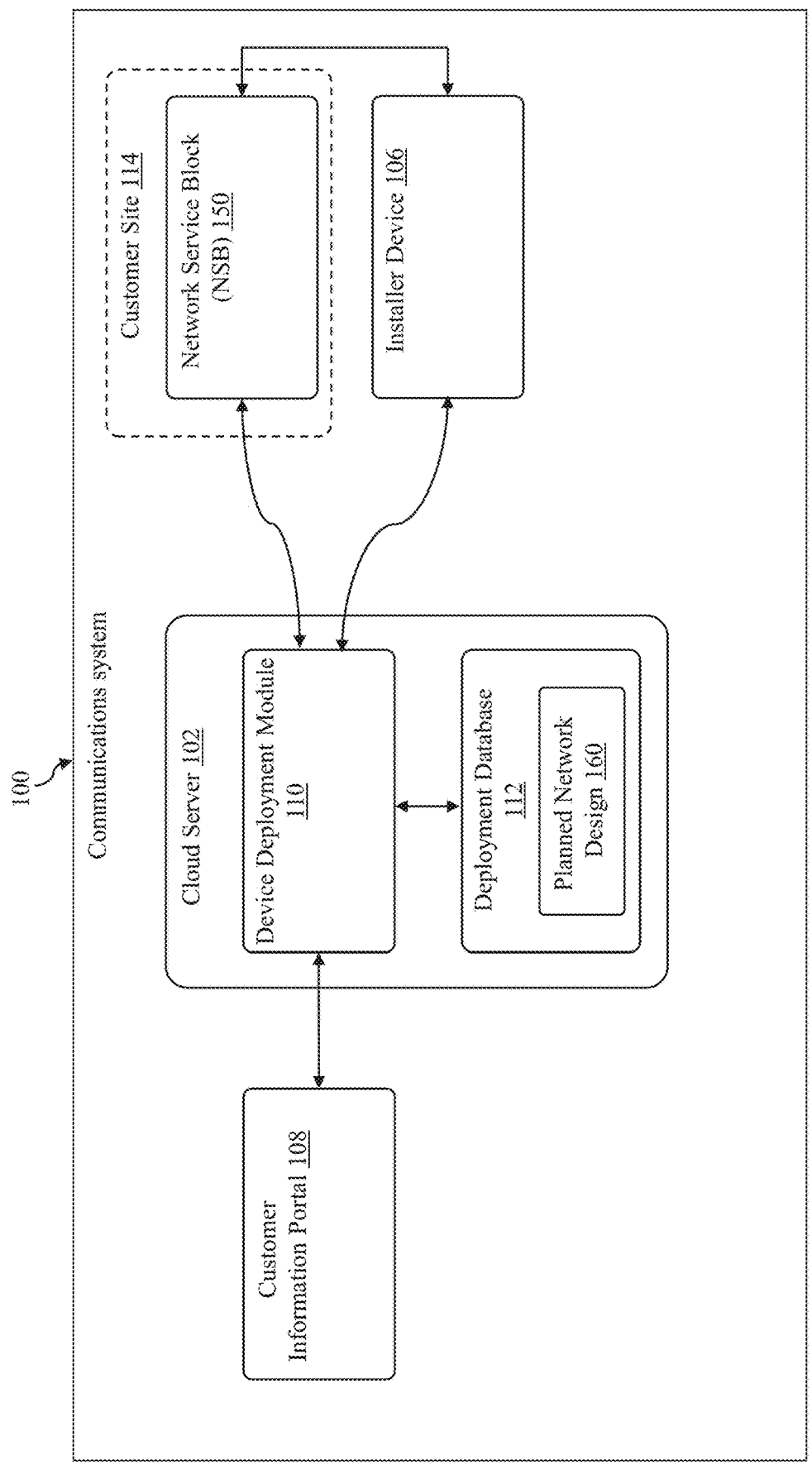
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a network service block (NSB) 150 within a customer site 114, an installer device 106, and an optional customer information portal 108. The cloud server, the network service block (NSB), the installer device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one NSB, more than one customer site, more than one installer device, and/or more than one customer information portal. In another example, although the cloud server, the NSB, the customer site, the installer device, and the customer information portal are shown in FIG. 1 as being connected in certain topology, the network topology of the communications system 100 is not limited to the topology shown in FIG. 1.

The cloud server 102 can be used to provide at least one service to a customer site (e.g., to the NSB 150 located at the customer site 114). The cloud server may be configured to facilitate or even provide automatic network service initiation to network devices (e.g., the NSB 150) at the customer site. Because the cloud server can facilitate automatic network service initiation to network devices at the customer site, network implementation efficiency and accuracy can be improved. In addition, because the cloud server can facilitate automatic network service initiation to network devices at the customer site, a network implementation operator (e.g., an operator of the installer device 106) does not need to be a network expert. For example, a network implementation operator may be a layperson (e.g., a worker on-site or an end-user such as an employee) at the customer site. Consequently, network implementation of network devices can be performed without relying on the expertise of an on-site network expert. For example, a layperson can perform network implementation functions in small offices and branches. Consequently, network deployment time can be shortened and the labor cost for network deployment can be reduced. In some embodiments, the cloud server is configured to receive a request for first network service configuration information from a first network device of the NSB 150, to transmit the first network service configuration information to the first network device of the NSB, where automatic network service initiation of the first network device of the NSB is performed at the customer site 114 based on the first network service configuration information, after the automatic network service initiation of the first network device of the NSB is performed, at the cloud server, to receive a request for second network service configuration information from a second network device of the NSB that is connected to the first network device, and to transmit the second network service configuration information to the second network device of the NSB, where automatic network service initiation of the second network device of the NSB is performed at the customer site based on the second network service configuration information. In some embodiments, automatic network service initiation of a dynamic host configuration protocol (DHCP) service, an open shortest path first (OSPF) service, and a link layer discovery protocol (LLDP) service in the first network device of the NSB is performed based on the first network service configuration information. In some embodiments, automatic network service initiation of an OSPF service or an LLDP service in the second network device of the NSB is performed based on the second network service configuration information. In some embodiments, the first network device of the NSB includes a distribution switch, while the second network device of the NSB includes a gateway, an access switch, a wireless access point, or a sensor. In some embodiments, the cloud server is configured to, after the automatic network service initiation of the first network device of the NSB is performed, receive the request for the second network service configuration information from the second network device of the NSB with a network address that is assigned to the second network device by the first network device. In some embodiments, the cloud server is configured to perform automatic network design for a network to be deployed or installed at the customer site. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

In the embodiment depicted in FIG. 1, the cloud server includes a device deployment module 110 and a deployment database 112 configured to store deployment data. In some embodiments, the device deployment module 110 is configured to facilitate or even provide automatic network service initiation to network devices (e.g., the NSB 150) at the customer site based on, for example, a planned network design 160 that is stored in the deployment database. The planned network design may include a network topology of network devices and corresponding network configurations and/or location information (e.g., building information, floor information, and/or in-building location information) of the network devices. Because the device deployment module can facilitate automatic network service initiation to network devices at the customer site, network implementation efficiency and accuracy can be improved. In addition, because the device deployment module can facilitate automatic network service initiation to network devices at the customer site, a network implementation operator (e.g., an operator of the installer device 106) does not need to be a network expert. For example, a network implementation operator may be a layperson (e.g., a worker on-site or an end-user such as an employee) at the customer site. Consequently, network deployment time can be shortened and the labor cost for network deployment can be reduced. In some embodiments, the device deployment module is configured to receive a request for first network service configuration information from a first network device of the NSB 150, to transmit the first network service configuration information to the first network device of the NSB, where automatic network service initiation of the first network device of the NSB is performed at the customer site 114 based on the first network service configuration information, after the automatic network service initiation of the first network device of the NSB is performed, at the cloud server, to receive a request for second network service configuration information from a second network device of the NSB that is connected to the first network device, and to transmit the second network service configuration information to the second network device of the NSB, where automatic network service initiation of the second network device of the NSB is performed at the customer site based on the second network service configuration information. In some embodiments, the device deployment module is configured to, after the automatic network service initiation of the first network device of the NSB is performed, receive the request for the second network service configuration information from the second network device of the NSB with a network address that is assigned to the second network device by the first network device. The device deployment module may be configured to perform a network device deployment service (e.g., a location based network device deployment service) for network devices and/or to perform automatic network design for a network at the customer site 114. In some embodiments, the deployment database 112 is configured to store deployment data for a network deployed and/or to be deployed at the customer site (e.g., a list of network devices deployed or to be deployed at the customer site). For example, the deployment database 112 is configured to store the planned network design 160, which may include a network topology of network devices (e.g., the NSB 150) and corresponding network configurations and/or location information (e.g., building information, floor information, and/or in-building location information) of the network devices. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site.

The customer site 114 may include one or more buildings, and each building may include one or more floors. Network devices (e.g., the NSB 150) that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In some embodiments, a network device that can be deployed at the customer site is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, a network device that can be deployed at the customer site may be compatible with Institute of Electrical and Electronics Engineers (IEEE) 802.3 protocol and/or one or more wireless local area network (WLAN) communications protocols, such as IEEE 802.11 protocol. In some embodiments, a network device that can be deployed at the customer site is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, a network device that can be deployed at the customer site is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, a network device that can be deployed at the customer site is a wireless station (STA) that wirelessly connects to a wireless AP. For example, the network device may be a laptop, a desktop personal computer (PC), a mobile phone, or other wireless device that supports at least one WLAN communications protocol (e.g., an IEEE 802.11 protocol)). In some embodiments, the NSB 150 is a standardized network block that includes a specific combination of network devices. In an embodiment, a customer network may be designed as a set of one or more NSBs. In an embodiment, the NSB is the foundational building block for network design and is replicable. The standardization of an NSB reduces the complexity in the network design and, hence makes the network design and Bill of Materials (BoM) generation automatable. In some embodiments, the NSB includes at least one distribution switch (DS) or distribution layer switch that functions as a bridge between at least one core layer switch and at least one access layer switch, at least one head end (HE) or gateway, at least one access switch (AS), at least one wireless access point (AP) connected to the at least one AS, and/or at least one wireless or wired sensor that wirelessly connects to the at least one wireless AP or is connected to the at least one wireless AP through at least one electrical cable or wire. However, the types of network devices that can be supported by the NSB 150 are not limited to the examples described. In some embodiments, the number of HEs and DSs is constant in the NSB 150 while the number of the wireless APs, the ASs and the sensors in the NSB 150 varies.

In some embodiments, a first network device of the NSB 150 is configured to pair with the installer device 106 at the customer site 114, to obtain first network service configuration information from the installer device, and to perform automatic network service initiation of the first network device of the NSB based on the first network service configuration information. In these embodiments, a second network device of the NSB that is connected with the first network device of the NSB is configured to obtain address information of a cloud server from the first network device of the NSB, to obtain second network service configuration information from the cloud server based on the address information, and to perform automatic network service initiation of the second network device of the NSB based on the second network service configuration information. In some embodiments, the first network device of the NSB is configured to pair the first network device of the NSB with the installer device at the customer site through a wireless connection (e.g., a Bluetooth connection) between the first network device of the NSB and the installer device and/or a wired connection between the first network device of the NSB and the installer device. In some embodiments, the first network device of the NSB includes a distribution switch, while the second network device of the NSB includes a gateway, an access switch, a wireless access point, or a sensor. In some embodiments, the second network device of the NSB is configured to request the second network service configuration information from the cloud server from a network address that is assigned to the second network device by the first network device. In some embodiments, the first network device of the NSB is configured to perform automatic network service initiation of a DHCP service, an OSPF service, and an LLDP service in the first network device of the NSB based on the first network service configuration information. In some embodiments, the second network device of the NSB is configured to perform automatic network service initiation of an OSPF service or an LLDP service in the second network device of the NSB based on the second network service configuration information. In some embodiments, the first network device of the NSB is configured to obtain further network service configuration information from the cloud server based on the first network service configuration information.

Figure 2:
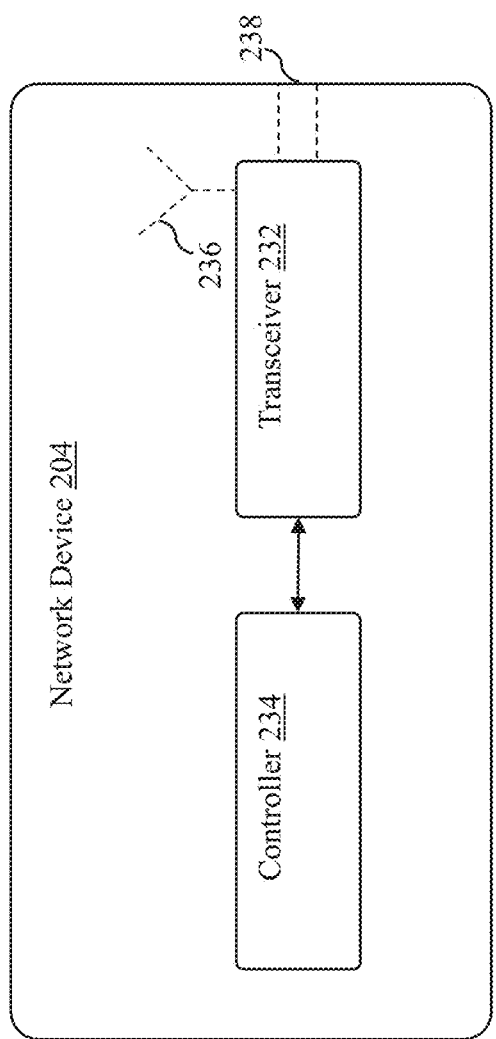
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the NSB 150 depicted in FIG. 1. However, network devices that can be included in the NSB 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in details with reference to FIG. 3. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any any suitable type of transceiver. For example, the transceiver 232 may be a short-range communications transceiver (e.g., a Bluetooth) or a LAN transceiver (e.g., a transceiver compatible with an IEEE 802.11 protocol). In some embodiments, the network device 204 includes multiple transceivers, for example, a short-range communications transceiver (e.g., a Bluetooth) and a LAN transceiver (e.g., a transceiver compatible with an IEEE 802.11 protocol). The controller 234 may be configured to control the transceiver 232 to process to process packets received through the antenna 236 and/or the network port 238 and/or to generate outgoing packets to be transmitted through the antenna 236 and/or the network port 238. In some embodiments, the controller 234 is configured to perform automatic network service initiation of the network device 204 based on network service configuration information, which may be received from the installer device 106 and/or the cloud server 102. For example, the controller 234 may be configured to perform automatic network service initiation of a dynamic host configuration protocol (DHCP) service, an open shortest path first (OSPF) service, and/or a link layer discovery protocol (LLDP) in the network device 204 based on network service configuration information, which may be received from the installer device 106 and/or the cloud server 102. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports.

Figure 3:
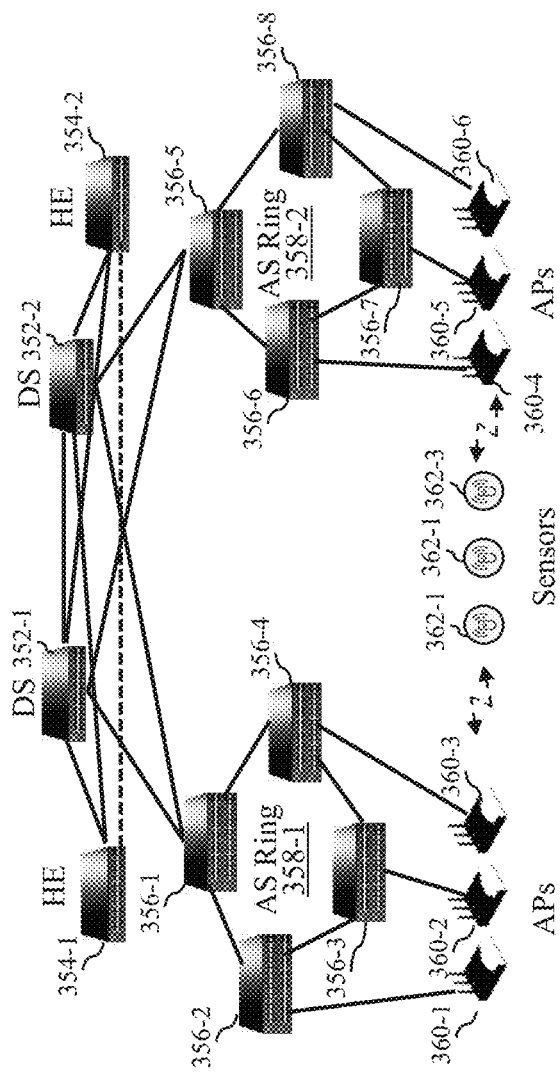
FIG. 3 depicts an embodiment of an NSB of the communications system depicted in FIG. 1.

FIG. 3 depicts an embodiment of an NSB 350 for the customer site 114. The NSB 350 depicted in FIG. 3 is one possible embodiment of the NSB 150 at the customer site 114 depicted in FIG. 1. However, the NSB 150 at the customer site 114 depicted in FIG. 1 are not limited to the embodiment shown in FIG. 3. In some embodiments, the NSB 350 is a basic building block for providing connectivity as a service and is a replicable block that can be scaled (e.g., expanded) to meet any deployment. In the embodiment depicted in FIG. 3, the NSB 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs. In some embodiments, the number of HEs and DSs is constant in the NSB 350 while the number of the wireless APs, the ASs and the sensors in the NSB 350 varies.

Turning back to the communications system 100 depicted in FIG. 1, the installer device 106 may be any type of suitable network device that is used by an operator to facilitate the deployment of network devices (e.g., the NSB 150) at the customer site 114. In some embodiments, the installer device may be fully or partially implemented as an IC device. In some embodiments, the installer device is a wireless communications device that includes at least one processor (e.g., a microcontroller, a DSP, and/or a CPU), at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a Personal Digital Assistant (PDA) etc. that supports one or more radio frequency (RF) communications protocols, including without limitation, Bluetooth, The Global System for Mobile Communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as an IEEE 802.11 protocol. For example, the installer device 106 is a wireless communications device, such as a handheld wireless device (e.g., cellular phone or a mobile phone) that supports multiple communications protocols, which may include at least one cellular communications protocol and at least short-range communications protocol (e.g., Bluetooth). In some embodiments, service initiation software or App is installed on the installer device 106 (e.g., a mobile phone or tablet). Because automatic network service initiation of network devices at the customer site can be facilitated by the cloud server 102 (e.g., the device deployment module 110), network implementation efficiency and accuracy can be improved. In addition, because automatic network service initiation of network devices at the customer site can be facilitated by the cloud server 102 (e.g., the device deployment module 110), an operator of the installer device does not need to be a network expert. For example, an operator of the installer device may be a non-network savvy person such as a contractor, a technician, or an end-user at the customer site 114. Consequently, network implementation of network devices can be performed without relying on the expertise of an on-site network expert. For example, a layperson can perform network implementation functions in small offices and branches. Consequently, network deployment time can be shortened and the labor cost for network deployment can be reduced. In some embodiments, the installer device is configured to receive information regarding deploying the NSB 150 at the customer site 114 at a mobile application of the installer device, at the customer site, to pair a first network device of the NSB with the mobile application of the installer device through a short range connection (e.g., a Bluetooth connection) between the first network device of the NSB and the installer device, and from the installer device, to transmit first network service configuration information to the first network device of the NSB. Automatic network service initiation of the first network device of the NSB is performed based on the first network service configuration information. In some embodiments, automatic network service initiation of a DHCP service, an OSPF service, and an LLDP service in the first network device of the NSB is performed based on the first network service configuration information. In some embodiments, automatic network service initiation of second network devices of the NSB that are connected to the first network device of the NSB is performed after automatic network service initiation of the first network device of the NSB is performed.

The customer information portal 108, which may be optional to the communications system 100, is configured to receive customer information. In some embodiments, the customer information portal includes a user interface that allows a customer to input information associated with network design for the customer site 114, such as one or more specific requirements or restrictions. For example, the user interface (e.g., a graphical user interface (GUI)) may allow a customer to input information associated with network design for the customer site. The customer information portal may be implemented in hardware (e.g., circuits), software, firmware, or a combination thereof.

Figure 4:
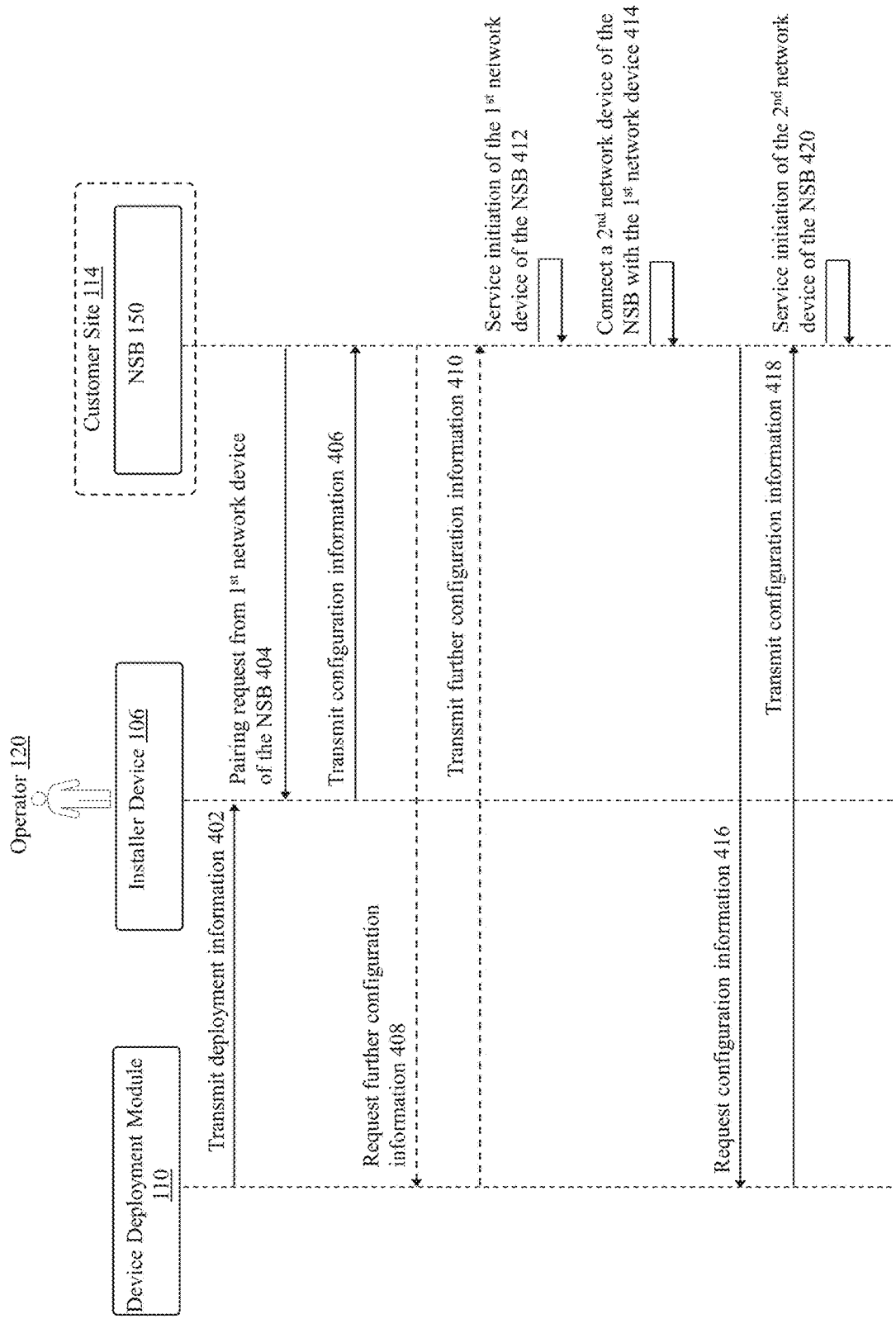
FIG. 4 shows a swim-lane diagram illustrating an example procedure of automatic network service initiation in the communications system depicted in FIG. 1.

FIG. 4 shows a swim-lane diagram illustrating an example procedure of automatic network service initiation in the communications system 100 depicted in FIG. 1. In this automatic network service initiation procedure, network services are automatically initiated for network devices (e.g., the NSB 150) deployed in the customer site 114. In some embodiments, an operator 120 of the installer device 106 connects a first network device (e.g., a distribution switch (DS)) of the NSB 150 to a router at the customer site and powers on the first network device prior to the automatic network service initiation procedure. In these embodiments, after one or more network services are automatically initiated for the first network device of the NSB, one or more network services are automatically initiated for other network elements of the NSB once these network elements are connected to the first network device directly or indirectly.

In operation 402, the cloud server 102 (e.g., the device deployment module 110) transmits deployment information to the installer device 106 that is operated by the operator 120. The operator may not be a network expert and may possess only basic knowledge of networking. In some embodiments, the deployment information includes a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site. The device deployment module may transmit the deployment information to a mobile app in the installer device. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.).

In operation 404, a pairing request is received at the installer device 106 from a first network device of the NSB 150. In some embodiments, the pairing request is received from a short-range communications connection between the first network device of the NSB and the installer device. In an embodiment, the installer device is paired with the first network device of the NSB through a Bluetooth connection to initiate a network service in the network device. In some embodiments, when the first network device of the NSB is connected to a router at the customer site 114, the local software on the first network device may turn on its Bluetooth module to "ready to pair" mode and pairs with the installer device over Bluetooth. For example, after the installer device connects the first network device to a router at the customer site, the operator 120 of the installer device goes physically near the first network device and pairs the installer device with the first network device over Bluetooth. In some embodiments, a paring request is transmitted from the first network device of the NSB to the installer device to setup a connection (e.g., a short-range communications connection) between the first network device of the NSB and the installer device. In some embodiments, the first network device of the NSB is a distribution switch (DS), for example, the DS 352-1 or 352-2 of the NSB 350 depicted in FIG. 3. For example, after one or more network services are automatically initiated for a DS of the NSB, corresponding network services are automatically initiated for other network elements of the NSB once these network elements are connected to the DS directly or indirectly.

Figure 5:
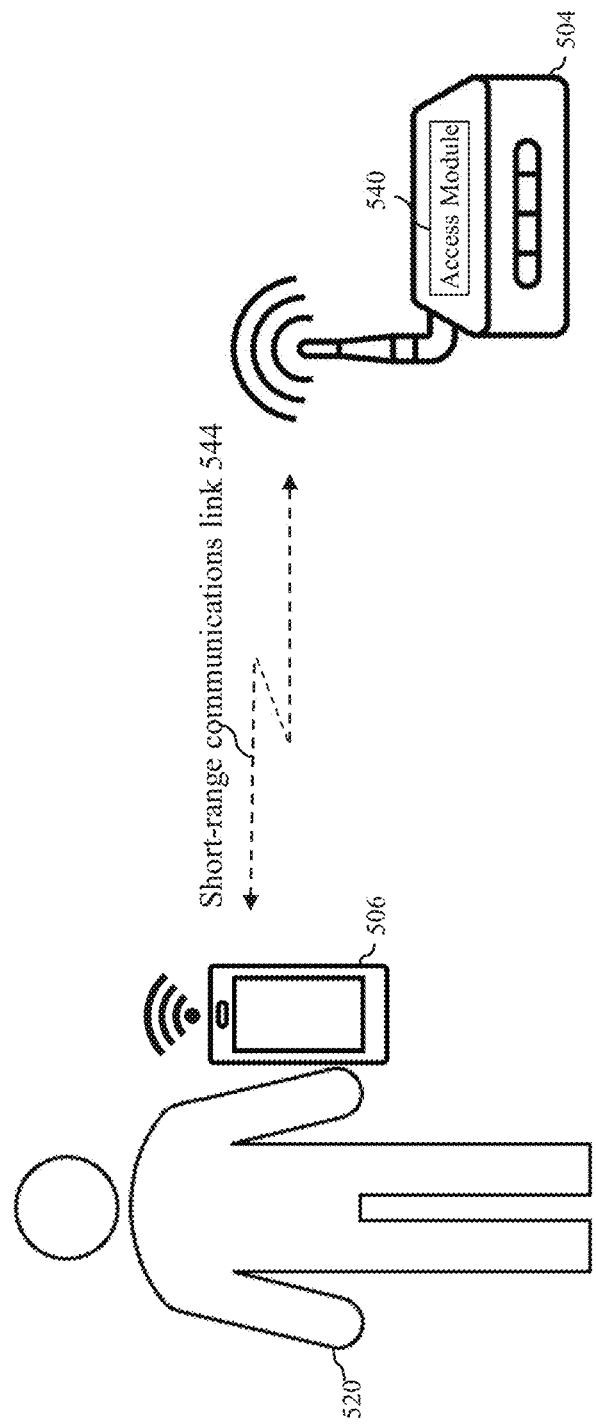
FIG. 5 depicts an operator having an installer device wirelessly connecting to a first network device of an NSB.

FIG. 5 depicts an operator 520 having an installer device 506 wirelessly connecting to a first network device 504 of the NSB 150. The network device 504 depicted in FIG. 5 may be an embodiment of the DS 352-1 or 352-2 depicted in FIG. 3, while the installer device 506 depicted in FIG. 5 may be an embodiment of the installer device 106 depicted in FIG. 1. However, the DS 352-1 or 352-2 depicted in FIG. 3 and the installer device 106 depicted in FIG. 1 are not limited to the embodiment shown in FIG. 5. In the embodiment depicted in FIG. 5, the first network device 504 contains an access module 540 configured to communicate with the installer device 506 (e.g., a mobile app at the installer device 506) that is operated by the operator 520. The access module may be implemented in hardware (e.g., circuits), software, firmware, or a combination thereof. In an example operation, the installer device 506 (e.g., a cellular phone or a mobile phone (e.g., a smart phone)) is paired with the access module (e.g., an access application) of the first network device 504 through a short-range communications link 544 (e.g., a Bluetooth communications link).

Turning back to the swim-lane diagram shown in FIG. 4, in operation 406, the installer device 106 that is operated by the operator 120 transmits configuration information to the first network device of the NSB 150, for example, through a short-range communications link (e.g., a Bluetooth connection). In some embodiments, the configuration information is included or derived from the deployment information transmitted from the cloud server 102 (e.g., the device deployment module 110) to the installer device 106 and/or input by the operator 120 of the installer device 106. In some embodiments, the configuration information includes network address configuration information (e.g., Internet Protocol (IP) address configuration information) for the first network device of the NSB 150. For example, the configuration information includes at least one port number of at least one DS port that is connected to at least one corresponding port of a router at the customer site 114, static IP address for the DS port(s) connected to customer router ports(s), a customer router side IP address, a domain name system (DNS) server IP address, an IP address of DS loopback interface, a peer DS loopback interface IP address, a fully qualified domain name (FQDN) of a cloud activation server (e.g., the cloud server 102), and/or a dynamic host configuration protocol (DHCP) address scope/range. The installer device may transmit configuration information to the first network device of the NSB 150 using a mobile app in the installer device. In some embodiments, the installer device 106 transmits network address configuration information to a DS of the NSB 150 (e.g., the DS 352-1 or 352-2 of the NSB 350 depicted in FIG. 3), for example, through a short-range communications link (e.g., a Bluetooth connection).

In operation 408, the first network device of the NSB 150 may request further configuration information from the cloud server 102 (e.g., the device deployment module 110) and/or another cloud server, for example, based on the configuration information (e.g., network address configuration information) received from the installer device 106. In some embodiments, the further configuration information includes open shortest path first (OSPF) configuration and/or link layer discovery protocol (LLDP) configuration for the first network device of the NSB 150. In operation 410, the requested further configuration information may be transmitted to the first network device of the NSB 150 from the cloud server 102 (e.g., the device deployment module 110) and/or another cloud server.

In operation 412, a service initiation (e.g., initiation of OSPF service and/or LLDP service) of the first network device of the NSB 150 is implemented, for example, based on the received configuration information and/or the received further configuration information. In some embodiments, a DHCP server is enabled on the first network device (e.g., a DS) of the NSB. In an embodiment, a DHCP server is enabled on two DSs of the NSB 150 (e.g., the DSs 352-1, 352-2 of the NSB 350 depicted in FIG. 3) and one of the two DSs is elected as Active and the other one of the two DSs is elected as Standby.

After one or more network services are automatically initiated for the first network device of the NSB 150, one or more network services are automatically initiated for other network elements (e.g., HEs, ASs, APs, and/or sensors) of the NSB once these network elements are connected to the first network device of the NSB 150 directly or indirectly. For example, in operation 414, a second network device of the NSB 150, which may be a HE (e.g., the HE 354-1 or 354-2 depicted in FIG. 3), an AS (e.g., the AS 356-1, 356-2, 356-3, 356-4, 356-5, 356-6, 356-7, or 356-8 depicted in FIG. 3), an AP (e.g., the wireless AP 360-1, 360-2, 360-3, 360-4, 360-5, or 360-6 depicted in FIG. 3), or a sensor (e.g., the wireless sensor 362-1, 362-2, or 362-3 depicted in FIG. 3), is connected to the first network device of the NSB 150. In some embodiments, when the second network device of the NSB 150 is connected to the first network device of the NSB 150, the second network device of the NSB 150 obtains address information (e.g., IP address configuration information) of a cloud server (e.g., the cloud server 102) from the first network device of the NSB. In some embodiments, when the second network device of the NSB 150 is connected to the first network device of the NSB 150, the second network device of the NSB 150 receives network address configuration information (e.g., IP address configuration information), such as a pre-allocated IP address for the second network device of the NSB 150, a corresponding DNS server IP address, and/or an FQDN of a cloud server (e.g., the cloud server 102).

In operation 416, the second network device of the NSB 150 may request service configuration information from the cloud server 102 (e.g., the device deployment module 110) and/or another cloud server, for example, based on network address configuration information received from the first network device of the NSB 150. In some embodiments, the service configuration information includes OSPF configuration and/or LLDP configuration for the second network device of the NSB 150. In operation 418, the requested service configuration information may be transmitted to the second network device of the NSB 150 from the cloud server 102 (e.g., the device deployment module 110) and/or another cloud server. In operation 420, a service initiation (e.g., initiation of OSPF service and/or LLDP service) of the second network device of the NSB 150 is done, for example, based on the received configuration information. In some embodiments, an OSPF service and/or an LLDP service is enabled on the second network device of the NSB, which may be, for example, a HE (e.g., the HE 354-1 or 354-2 depicted in FIG. 3), an AS (e.g., the AS 356-1, 356-2, 356-3, 356-4, 356-5, 356-6, 356-7, or 356-8 depicted in FIG. 3), an AP (e.g., the wireless AP 360-1, 360-2, 360-3, 360-4, 360-5, or 360-6 depicted in FIG. 3), or a sensor (e.g., the wireless sensor 362-1, 362-2, or 362-3 depicted in FIG. 3.

Figure 6:
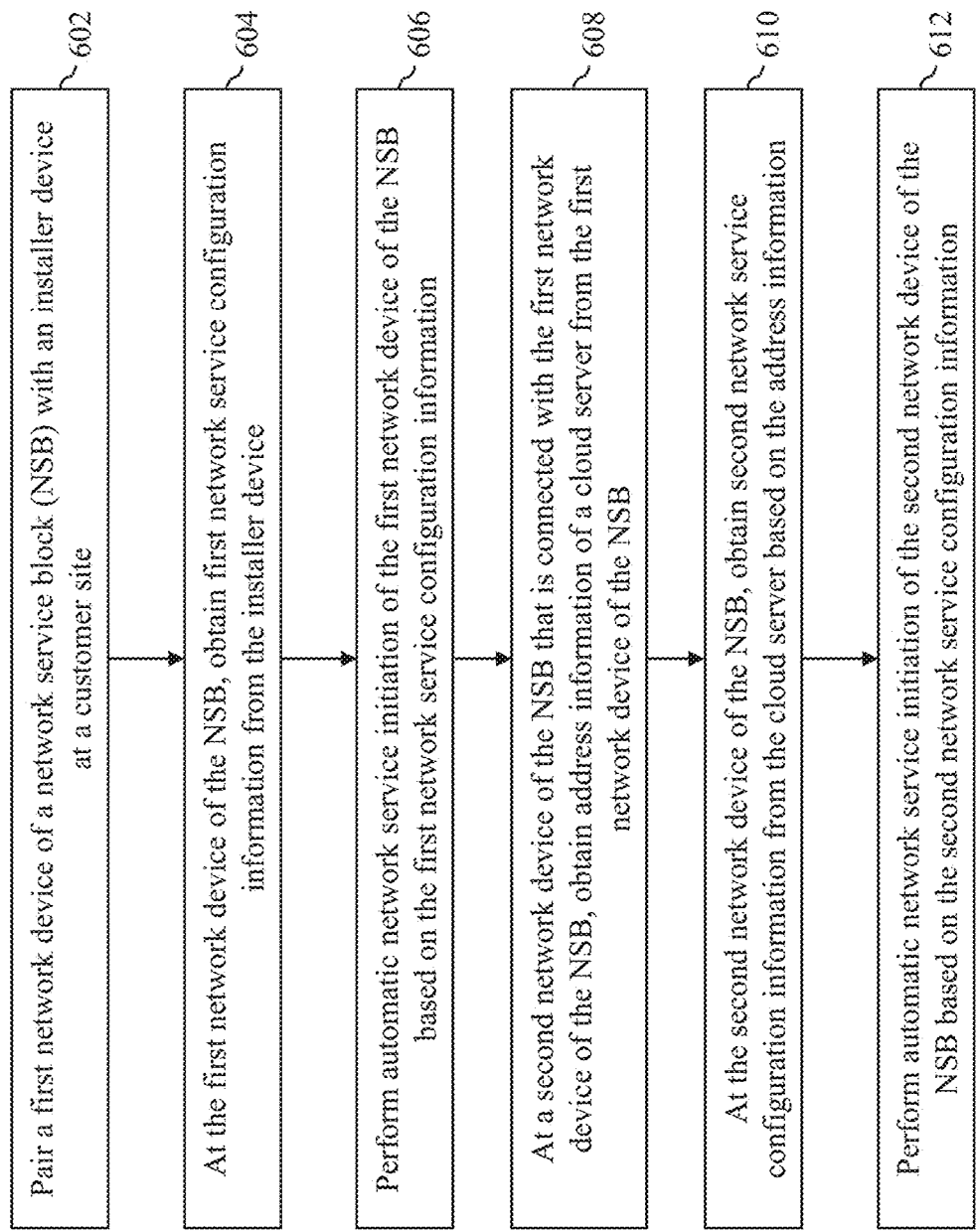
FIG. 6 is a process flow diagram of a method of automatic network service initiation in accordance to an embodiment of the invention.

FIG. 6 is a process flow diagram of a method of automatic network service initiation in accordance to an embodiment of the invention. According to the method, at block 602, a first network device of a network service block (NSB) is paired with an installer device at a customer site. In some embodiments, the first network device of the NSB is paired with the installer device at the customer site through a Bluetooth connection between the first network device of the NSB and the installer device. In some embodiments, the first network device of the NSB is paired with the installer device using a mobile application in the installer device at the customer site through a short-range connection between the first network device of the NSB and the installer device. In some embodiments, the NSB includes a pair of distribution switches, a pair of gateways that are connected to the distribution switches, access switches that are connected to the gateways, wireless access points (APs) that are connected to the access switches, and wireless sensors that wirelessly connect to the wireless APs. In some embodiments, the first network device of the NSB includes a distribution switch. At block 604, at the first network device of the NSB, first network service configuration information is obtained from the installer device. At block 606, automatic network service initiation of the first network device of the NSB is performed based on the first network service configuration information. In some embodiments, the automatic network service initiation of a dynamic host configuration protocol (DHCP) service, an open shortest path first (OSPF) service, and a link layer discovery protocol (LLDP) service in the first network device of the NSB is performed based on the first network service configuration information. At block 608, at a second network device of the NSB that is connected with the first network device of the NSB, address information of a cloud server is obtained from the first network device of the NSB. In some embodiments, the second network device of the NSB includes a gateway, an access switch, a wireless access point, or a sensor. At block 610, at the second network device of the NSB, second network service configuration information is obtained from the cloud server based on the address information. At block 612, automatic network service initiation of the second network device of the NSB is performed based on the second network service configuration information. In some embodiments, the automatic network service initiation of an OSPF service or an LLDP service in the second network device of the NSB is performed based on the second network service configuration information. In some embodiments, at the first network device of the NSB, further network service configuration information is obtained from the cloud server based on the first network service configuration information. In some embodiments, at the second network device of the NSB, the second network service configuration information is requested from the cloud server from a network address that is assigned to the second network device by the first network device. The operations 602, 604, 606, 608, 610, 612 in the flow diagram of FIG. 6 may correspond to the operations 404, 406, 412, 414, 418, 420 in the swim-lane diagram of FIG. 4. The NSB may be similar to, the same as, or a component of the NSB 150 depicted in FIG. 1 and/or the NSB 350 depicted in FIG. 3. The cloud server may be similar to, the same as, or a component of the cloud server 102 depicted in FIG. 1. The first network device may be similar to, the same as, or a component of the DSs 352-1, 352-2 of the NSB 350 depicted in FIG. 3 and/or the network device 504 depicted in FIG. 5. The second network device may be similar to, the same as, or a component of the HEs 354-1, 354-2 of the NSB 350, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 depicted in FIG. 3. The installer device may be similar to, the same as, or a component of the installer device 106 depicted in FIG. 1. The customer site may be similar to, the same as, or a component of the customer site 114 depicted in FIG. 1.

Figure 7:
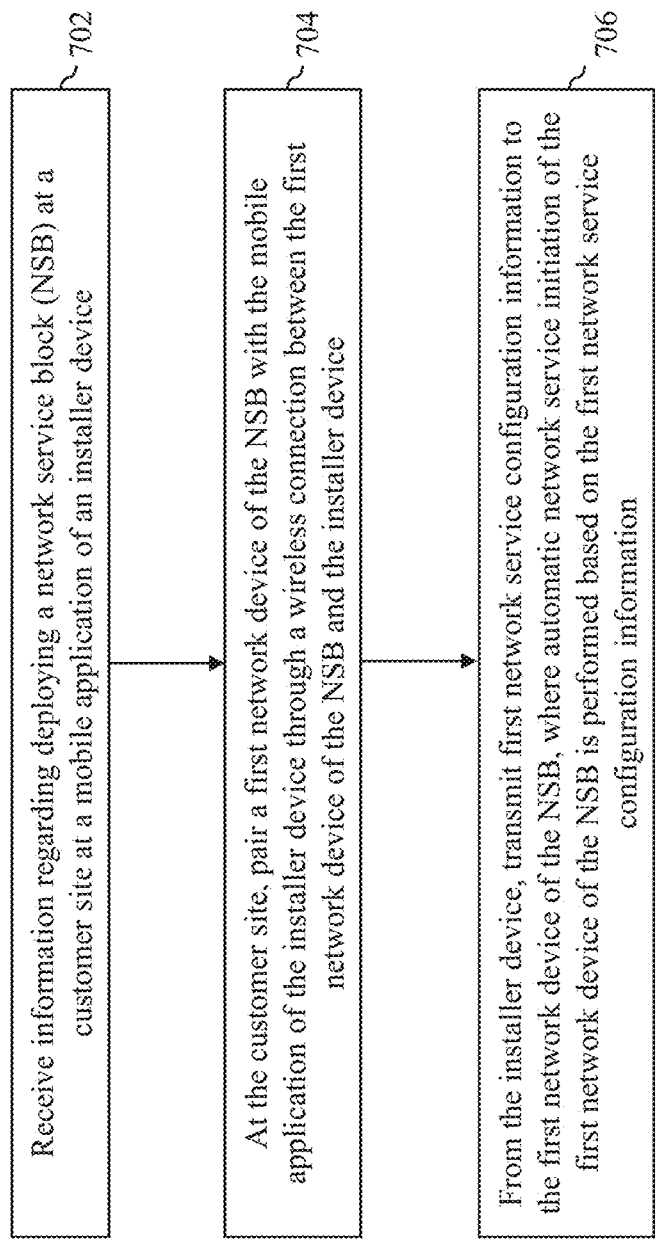
FIG. 7 is a process flow diagram of a method of automatic network service initiation in accordance to an embodiment of the invention.

FIG. 7 is a process flow diagram of a method of automatic network service initiation in accordance to an embodiment of the invention. According to the method, at block 702, information regarding deploying a network service block (NSB) at a customer site is received at a mobile application of an installer device. At block 704, at the customer site, a first network device of the NSB is paired with the mobile application of the installer device through a wireless (e.g., Bluetooth) connection between the first network device of the NSB and the installer device. At block 706, from the installer device, first network service configuration information is transmitted to the first network device of the NSB, where automatic network service initiation of the first network device of the NSB is performed based on the first network service configuration information. In some embodiments, automatic network service initiation of a DHCP service, an OSPF service, and an LLDP service in the first network device of the NSB is performed based on the first network service configuration information. In some embodiments, automatic network service initiation of second network devices of the NSB that are connected to the first network device of the NSB is performed after automatic network service initiation of the first network device of the NSB is performed. The operations 702, 704, 706 in the flow diagram of FIG. 7 may correspond to the operations 402, 404, 406 in the swim-lane diagram of FIG. 4. The NSB may be similar to, the same as, or a component of the NSB 150 depicted in FIG. 1 and/or the NSB 350 depicted in FIG. 3. The first network device may be similar to, the same as, or a component of the DSs 352-1, 352-2 of the NSB 350 depicted in FIG. 3 and/or the network device 504 depicted in FIG. 5. The installer device may be similar to, the same as, or a component of the installer device 106 depicted in FIG. 1. The customer site may be similar to, the same as, or a component of the customer site 114 depicted in FIG. 1.

Figure 8:
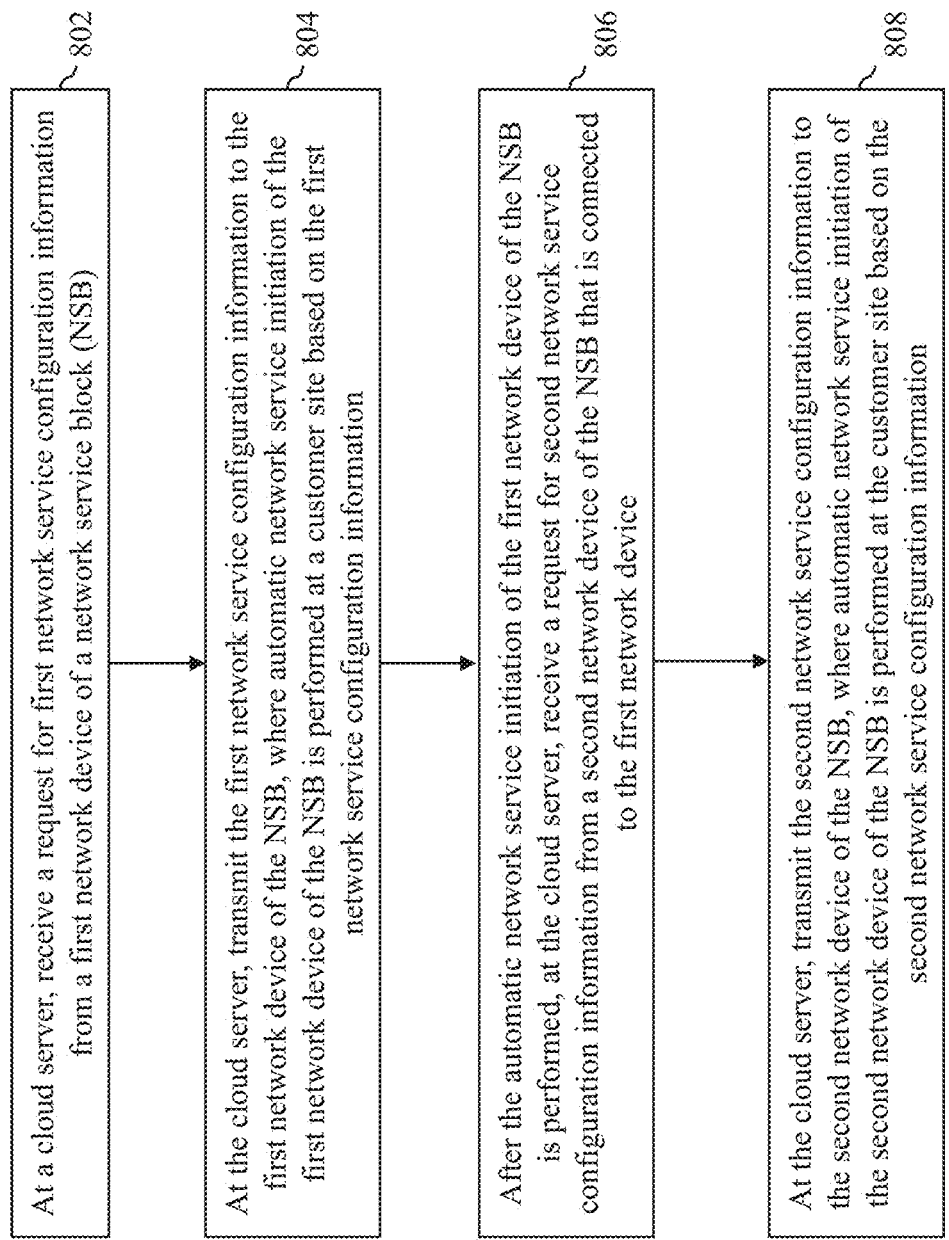
FIG. 8 is a process flow diagram of a method of automatic network service initiation in accordance to an embodiment of the invention.

FIG. 8 is a process flow diagram of a method of automatic network service initiation in accordance to an embodiment of the invention. According to the method, at block 802, at a cloud server, a request for first network service configuration information is received from a first network device of a network service block (NSB). At block 804, at the cloud server, the first network service configuration information is transmitted to the first network device of the NSB, where automatic network service initiation of the first network device of the NSB is performed at a customer site based on the first network service configuration information. In some embodiments, the first network device of the NSB includes a distribution switch. In some embodiments, the automatic network service initiation of a DHCP service, an OSPF service, and an LLDP service in the first network device of the NSB is performed based on the first network service configuration information. In some embodiments, the NSB includes a pair of distribution switches, a pair of gateways that are connected to the distribution switches, access switches that are connected to the gateways, wireless APs that are connected to the access switches, and wireless sensors that wirelessly connect to the wireless APs. At block 806, after the automatic network service initiation of the first network device of the NSB is performed, at the cloud server, a request for second network service configuration information is received from a second network device of the NSB that is connected to the first network device. In some embodiments, the second network device of the NSB includes a gateway, an access switch, a wireless access point, or a sensor. In some embodiments, after the automatic network service initiation of the first network device of the NSB is performed, the request for the second network service configuration information is received from the second network device of the NSB with a network address that is assigned to the second network device by the first network device. At block 808, at the cloud server, the second network service configuration information is transmitted to the second network device of the NSB, where automatic network service initiation of the second network device of the NSB is performed at the customer site based on the second network service configuration information. In some embodiments, the automatic network service initiation of an OSPF service or a LLDP service in the second network device of the NSB is performed based on the second network service configuration information. The operations 802, 804, 806, 808 in the flow diagram of FIG. 8 may correspond to the operations 408, 410, 416, 418 in the swim-lane diagram of FIG. 4. The NSB may be similar to, the same as, or a component of the NSB 150 depicted in FIG. 1 and/or the NSB 350 depicted in FIG. 3. The cloud server may be similar to, the same as, or a component of the cloud server 102 depicted in FIG. 1. The first network device may be similar to, the same as, or a component of the DSs 352-1, 352-2 of the NSB 350 depicted in FIG. 3 and/or the network device 504 depicted in FIG. 5. The second network device may be similar to, the same as, or a component of the HEs 354-1, 354-2 of the NSB 350, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 depicted in FIG. 3. The customer site may be similar to, the same as, or a component of the customer site 114 depicted in FIG. 1.

Figure 9:
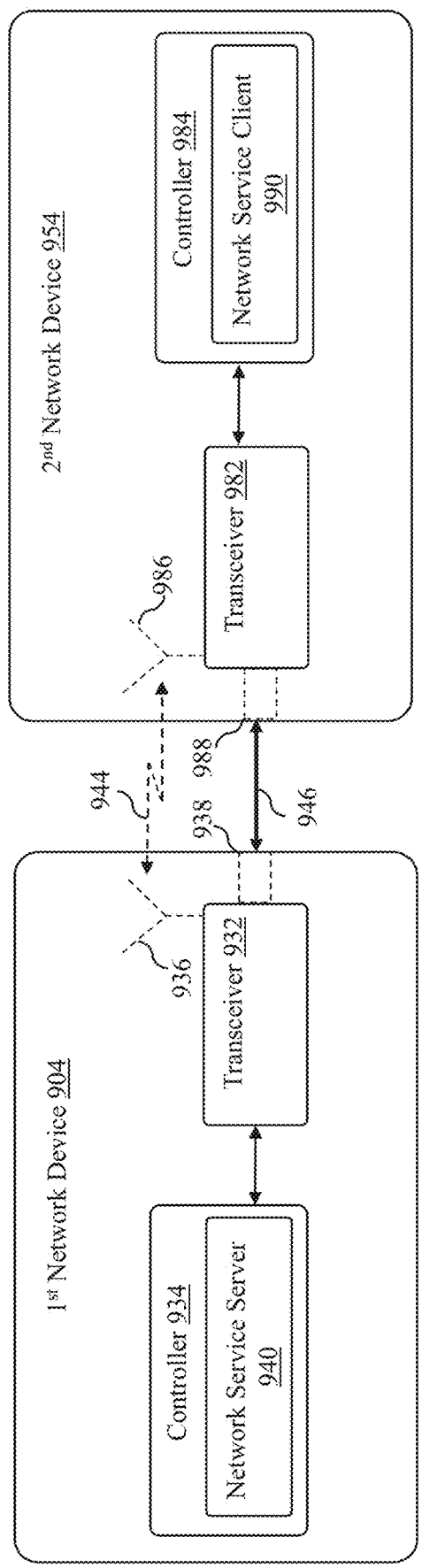
FIG. 9 depicts a first network device having a network service server and a second network device having a network service client.

FIG. 9 depicts a first network device 904 having a network service server 940 and a second network device 954 having a network service client 990. The first and second network devices 904, 954 depicted in FIG. 9 may be embodiments of network devices that are included in the NSB 150 depicted in FIG. 1 and/or the NSB 350 depicted in FIG. 3. However, network devices that can be included in the NSB 150 depicted in FIG. 1 and/or the NSB 350 depicted in FIG. 3 are not limited to the embodiments depicted in FIG. 9. The first and second network devices 904, 954 depicted in FIG. 9 may be any suitable type of network devices. For example, the first network device 904 may be a distribution switch, while the second network device 954 may be a gateway, an access switch, a wireless access point, or a sensor.

In the embodiment depicted in FIG. 9, the first network device 904 includes a wireless and/or wired transceiver 932, a controller 934 operably connected to the transceiver 932, at least one optional antenna 936 operably connected to the transceiver 932, and at least one optional network port 938 operably connected to the transceiver 932. In some embodiments, the transceiver 932 includes a PHY device. The transceiver 932 may be any any suitable type of transceiver. For example, the transceiver 932 may be a short-range communications transceiver (e.g., a Bluetooth) or a LAN transceiver (e.g., a transceiver compatible with an IEEE 802.11 protocol). In some embodiments, the first network device 904 includes multiple transceivers, for example, a short-range communications transceiver (e.g., a Bluetooth) and a LAN transceiver (e.g., a transceiver compatible with an IEEE 802.11 protocol). The controller 934 may be configured to control the transceiver 932 to process to process packets received through the antenna 936 and/or the network port 938 and/or to generate outgoing packets to be transmitted through the antenna 936 and/or the network port 938. In some embodiments, the controller 934 is configured to perform automatic network service initiation of the first network device 904 based on network service configuration information, which may be received from the installer device 106 and/or the cloud server 102. For example, the controller 934 may be configured to perform automatic network service initiation of a dynamic host configuration protocol (DHCP) service, an open shortest path first (OSPF) service, and/or a link layer discovery protocol (LLDP) in the first network device 904 based on network service configuration information, which may be received from the installer device 106 and/or the cloud server 102. The antenna 936 may be any suitable type of antenna. For example, the antenna 936 may be an induction type antenna such as a loop antenna or any other suitable type of induction type antenna. However, the antenna 936 is not limited to an induction type antenna. The network port 938 may be any suitable type of port. For example, the network port 938 may be a LAN network port such as an Ethernet port. However, the network port 938 is not limited to LAN network ports. In the embodiment depicted in FIG. 9, the second network device 954 includes a wireless and/or wired transceiver 982, a controller 984 operably connected to the transceiver 982, at least one optional antenna 986 operably connected to the transceiver 982, and at least one optional network port 988 operably connected to the transceiver 982. In some embodiments, the transceiver 982 includes a PHY device. The transceiver 982 may be any any suitable type of transceiver. For example, the transceiver 982 may be a short-range communications transceiver (e.g., a Bluetooth) or a LAN transceiver (e.g., a transceiver compatible with an IEEE 802.11 protocol). The controller 984 may be configured to control the transceiver 982 to process to process packets received through the antenna 986 and/or the network port 988 and/or to generate outgoing packets to be transmitted through the antenna 986 and/or the network port 988. In some embodiments, the controller 984 is configured to perform automatic network service initiation of the second network device 954 based on network service configuration information, which may be received from the cloud server 102. For example, the controller 984 may be configured to perform automatic network service initiation of an OSPF service and/or an LLDP in the second network device 954 based on network service configuration information, which may be received from the cloud server 102. The antenna 986 may be any suitable type of antenna. For example, the antenna 986 may be an induction type antenna such as a loop antenna or any other suitable type of induction type antenna. However, the antenna 986 is not limited to an induction type antenna. The network port 988 may be any suitable type of port. For example, the network port 988 may be a LAN network port such as an Ethernet port. However, the network port 988 is not limited to LAN network ports.

In the embodiment depicted in FIG. 9, the first network device 904 includes the network service server 940, which may be implemented in hardware (e.g., circuits), software, firmware, or a combination thereof. In some embodiments, the network service server 940 is implemented within the controller 934. However, in other embodiments, the network service server 940 may be partially or completely implemented externally to the controller 934. In the embodiment depicted in FIG. 9, the second network device 954 includes the network service client 990, which may be implemented in hardware (e.g., circuits), software, firmware, or a combination thereof. In some embodiments, the network service client 990 is implemented within the controller 984. However, in other embodiments, the network service client 990 may be partially or completely implemented externally to the controller 984. The network service client 990 may communicate with the network service server 940 through a wired connection 946 between the network port 938 of the first network device 904 and the network port 988 of the second network device 954 and/or a wireless connection 944 between the antenna 936 of the first network device 904 and the antenna 986 of the second network device 954. In the embodiment depicted in FIG. 9, the network service server 940 is configured to assign network addresses and/or provide other network information (e.g., a cloud server address) to network service clients and the network service client 990 is configured to request network address and other information from the network service server 940. In some embodiments, the network service server 940 is a DHCP server configured to assign IP addresses and/or provide other network information (e.g., an IP address of a DNS server, an IP address of another network device (e.g., an intermediate device), and/or a cloud server address) to DHCP clients and the network service client 990 is a DHCP client configured to request IP address and other information from the network service server 940.

An example operation of automatic network service initiation of the NSB 350 depicted in FIG. 3 is described with reference to FIGS. 10-14. In this example operation, network services are first automatically initiated for the DSs 352-1, 352-2 of the NSB 350. Subsequently, network services are automatically initiated for the HEs 354-1, 354-2 of the NSB 350, for the ASs 356-1, 356-2, 356-3, 356-4, 356-5, 356-6, 356-7, 356-8, for the wireless APs 360-1, 360-2, 360-3, 360-4, 360-5, 360-6, and for the wireless sensors 362-1, 362-2, 362-3, respectively, once these network elements are connected to the DSs 352-1, 352-2 directly or indirectly. Prior to this example operation, the operator 120 of the installer device 106 connects the DSs 352-1, 352-2 of the NSB 350 to a router at the customer site 114 and powers on the DSs 352-1, 352-2.

Figure 10:
FIGS. 10-14 depict results of an example operation of automatic network service initiation of the NSB depicted in FIG. 3.

FIG. 10 depicts a result of a first step of the example operation. In this first step, once each of the DSs 352-1, 352-2 of the NSB 350 performs a secure boot, each of the DSs 352-1, 352-2 may pair with a mobile app in the installer device 106 via Bluetooth. The mobile app's interface can be used to configure the configuration for each of the DSs 352-1, 352-2 (e.g., by the operator 120 of the installer device 106 and/or automatically configured by the installer device 106 based on network configuration information received from the cloud server 102), which includes a port number of a DS port that is connected to a corresponding port of a router at the customer site 114, a static IP address for the DS port(s) connected to customer router ports(s), a customer router side IP address, a domain name system (DNS) server IP address, an IP address of DS loopback interface, a peer DS loopback interface IP address, a FQDN of a cloud activation server (e.g., the cloud server 102 or another cloud server), and a dynamic host configuration protocol (DHCP) address scope/range. DHCP servers may be enabled on both of the DSs 352-1, 352-2 and one DHCP server of the DSs 352-1, 352-2 is elected as active and the other DHCP server of the DSs 352-1, 352-2 is elected as standby. Based on the configuration, the DSs 352-1, 352-2 may request and receive OSPF and LLDP configurations from the cloud server 102 or another cloud server. Once the link between the DSs 352-1, 352-2 is setup, OSPF and LLDP in adjacencies are formed on the link.

Figure 11:
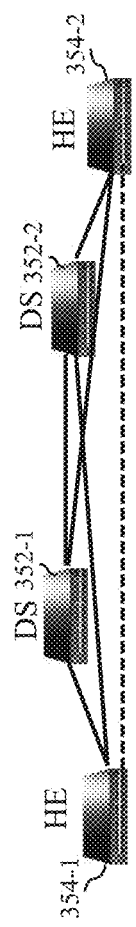

FIG. 11 depicts a result of a second step of the example operation that takes place after the first step. In this second step, after each of the HEs 354-1, 354-2 of the NSB 350 completes a successful bootup, each of the HEs 354-1, 354-2 may send a DHCP request using a DHCP client on its connected interface. In some embodiments, each HE uses DHCP option 60 in a DHCP request to indicate that the request is from a HE. The active DHCP server on the DSs 352-1, 352-2 may return a pre-allocated IP address that may be assigned to a loopback interface and a DNS server IP address, and return, using a sub-option (e.g., option 43), the FQDN of a cloud server (e.g., the cloud server 102 or other cloud server). Each of the HEs 354-1, 354-2 may reach out to the corresponding cloud sever to obtain its configuration (e.g., LLDP configuration) on the HE. OSPF service is not enabled on the HEs. Each of the HEs 354-1, 354-2 may also establish a gRPC Remote Procedure Calls (gRPC) channel to a corresponding DS 352-1 or 352-2. Each of the HEs 354-1, 354-2 may also configure a default route to a corresponding DS 352-1 or 352-2 in its routing table, the next_hop for the default route can be derived from the LLDP configuration.

Figure 12:
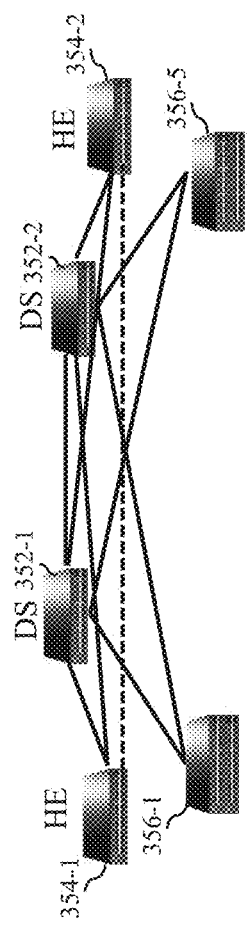

FIG. 12 depicts a result of a third step of the example operation that takes place after the second step. In this third step, out of the ASs 356-1, 356-2, 356-3, 356-4, 356-5, 356-6, 356-7, 356-8, the ASs 356-1, 356-5 that are directly connected to the DSs 352-1, 352-2 is brought into service first. Each AS 356-1 or 356-5, after successful bootup, sends a DHCP request using its DHCP client on its interface connected to a corresponding DS 352-1 or 352-2 to a DHCP server at the DS 352-1 or 352-2. Each AS 356-1 or 356-5 may use DHCP option 60 to identify itself as an AS in the DHCP request. Each AS 356-1 or 356-5 may reach out to a cloud server (e.g., the cloud server 102 or other cloud server) to obtain its configuration (e.g., LLDP and OSPF configuration). Each AS 356-1 or 356-5 may also receive a "DHCP helper" configuration and programs the configuration in all its access interfaces and the interfaces that connect the other access switches in the ring 358-1 or 358-2. The DHCP server on a corresponding DS 352-1 or 352-2 may return an IP address of the AS (e.g., assigned to loopback) and a DNS server IP address and return, using a sub-option (e.g., option 43), the FQDN of a cloud server (e.g., the cloud server 102 or other cloud server) and a corresponding HE IP address.

Figure 13:
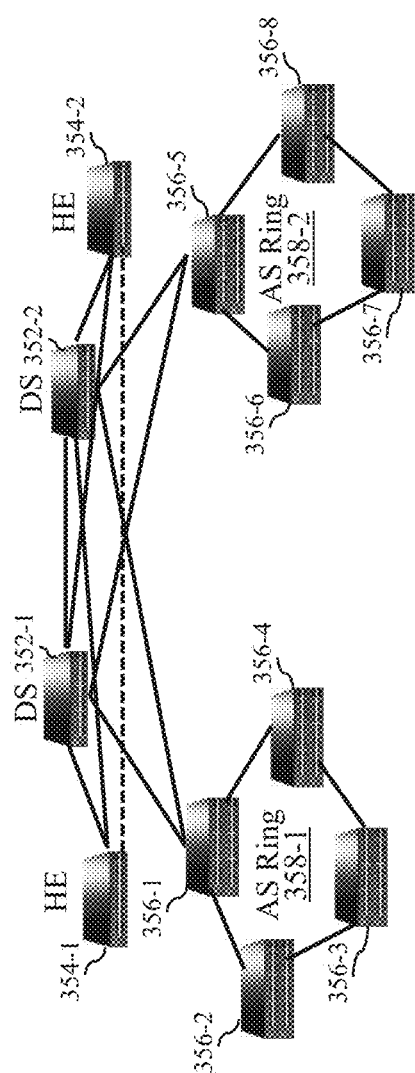

FIG. 13 depicts a result of a fourth step of the example operation that takes place after the third step. In this fourth step, all downstream ASs 356-2, 356-3, 356-4, 356-6, 356-7, 356-8 in the ring 358-1 or 358-2 that are not directly connected to a corresponding DS 352-1 or 352-2 may send a DHCP request on the "ring interfaces" with option 60 identifying themselves. The DHCP helper configuration on the upstream AS 356-1 or 356-5 may relay the DHCP request to the DHCP server on a corresponding DS 352-1 or 352-2. The DHCP server on a corresponding DS 352-1 or 352-2 may return an IP address of the AS (e.g., assigned to loopback) and a DNS server IP address and return, using a sub-option (e.g., option 43), the FQDN of a cloud server (e.g., the cloud server 102 or other cloud server), and a corresponding HE IP address. All downstream ASs 356-2, 356-3, 356-4, 356-6, 356-7, 356-8 may reach out to the corresponding cloud server to obtain their configuration and turn on OSPF and LLDP on the ring interfaces and the uplink interfaces to the corresponding DS (e.g., LLDP and OSPF are not enabled on the access ports of the access switch). All the ASs may also establish a gRPC channel to a corresponding HE and a Generic Routing Encapsulation (GRE) tunnel to the corresponding HE.

Figure 14:
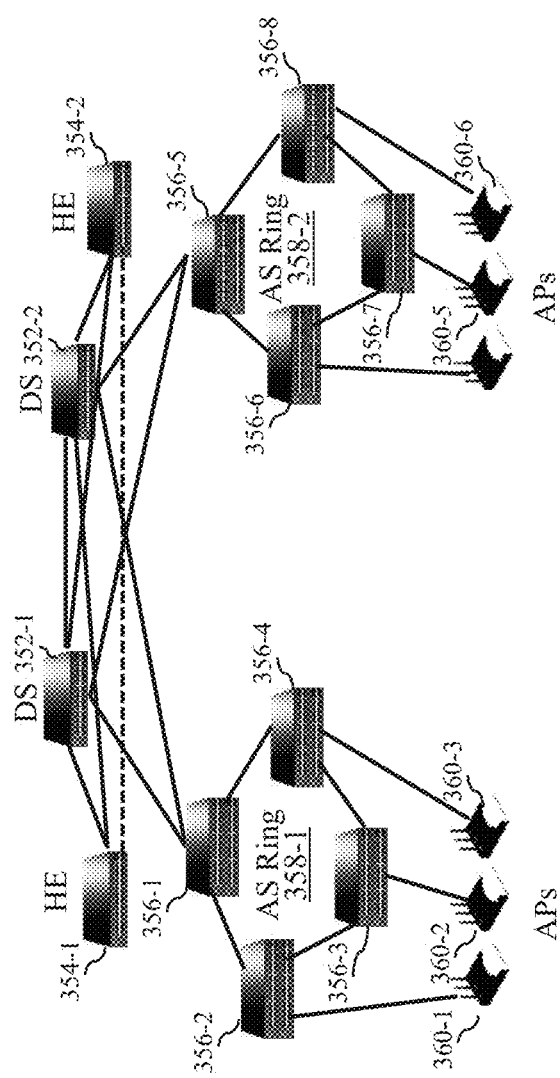

FIG. 14 depicts a result of a fifth step of the example operation that takes place after the fourth step. In this fifth step, each of the wireless APs 360-1, 360-2, 360-3, 360-4, 360-5, 360-6 may receive its power from a corresponding power over ethernet (PoE) port of a corresponding AS 356-2, 356-3, 356-4, 356-6, 356-7, or 356-8. Each AP, after successful boot, sends a DHCP request through its DHCP client. For example, each AP may identify itself in the DHCP request using option 60. A corresponding AS relays the DHCP request to a corresponding DHCP server running on the DS 352-1 or 352-2. In some embodiments, a mechanism is implemented to differentiate an AP DHCP request from a client-end point DHCP request on an access port such that the client end point DHCP requests can enter a GRE tunnel. The corresponding DHCP server on the corresponding DS may return an IP address of the AP (assigned to AP loopback) and a DNS Server IP address and return, using a sub-option (e.g., option 43), a HE IP address, and the FQDN of a cloud server (e.g., the cloud server 102 or other cloud server). The APs may reach out to the cloud server to obtain their configuration and run LLDP on the uplinks connected to a corresponding AS. Each AP may also establish a gRPC channel to a corresponding HE and a GRE tunnel to the corresponding HE. Similarly, network services are automatically initiated for the wireless sensors 362-1, 362-2, 362-3.

Figure 15:
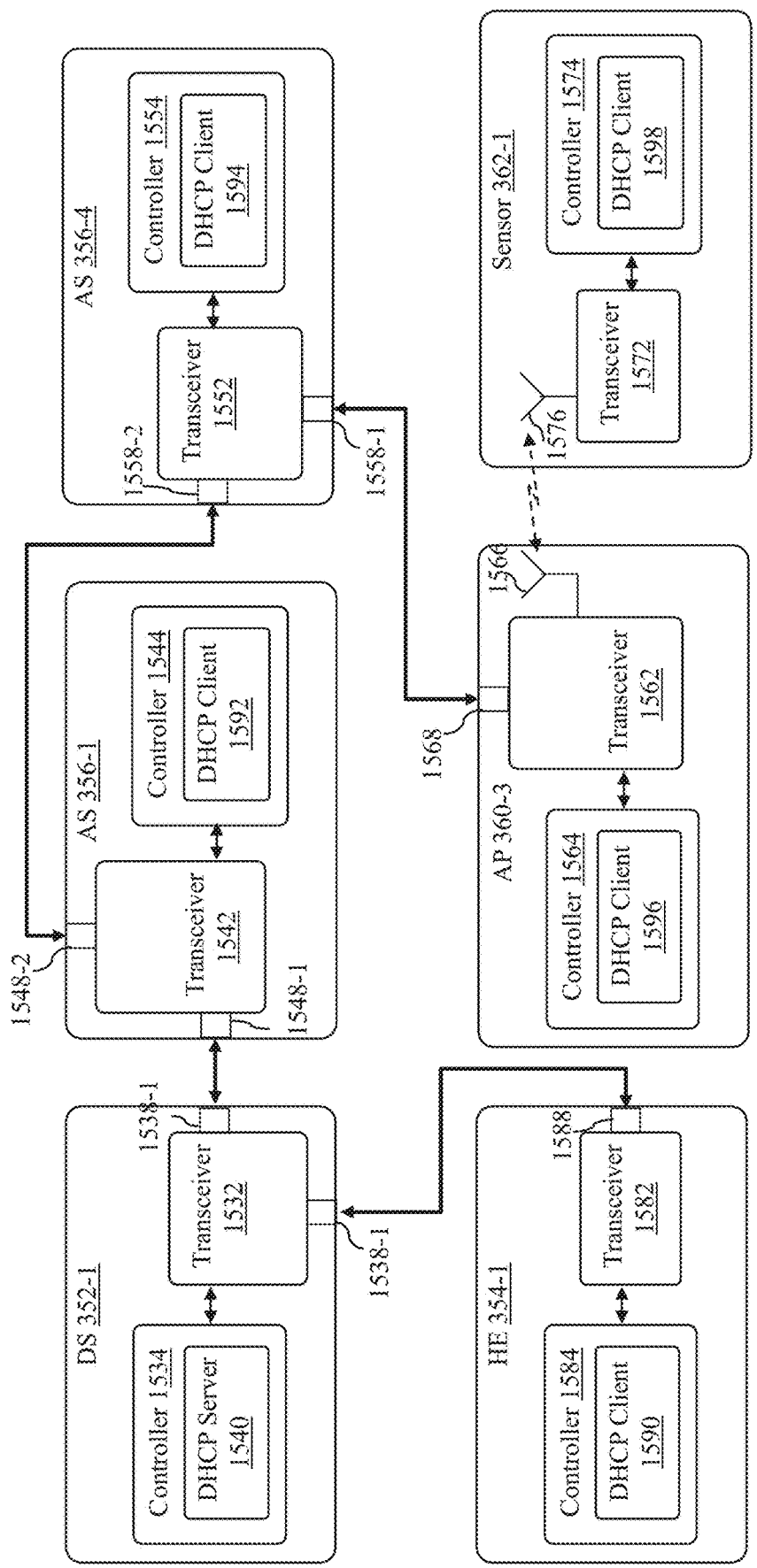
FIG. 15 depicts an embodiment of some network devices of the NSB depicted in FIG. 3.

FIG. 15 depicts an embodiment of the DS 352-1, the HE 354-1, the AS 356-1, the AS 356-4, the wireless AP 360-3, and the wireless sensor 362-1 of the NSB 350 depicted in FIG. 3. However, the DS 352-1, the HE 354-1, the AS 356-1, the AS 356-4, the wireless AP 360-3, and the wireless sensor 362-1 depicted in FIG. 3 are not limited to the embodiments depicted in FIG. 15. In the embodiment depicted in FIG. 15, the DS 352-1 includes a wired transceiver 1532, a controller 1534 operably connected to the transceiver 1532 that includes a DHCP server 1540, and network ports 1538-1, 1538-2 operably connected to the transceiver 1532. The HE 354-1 includes a wired transceiver 1582, a controller 1584 operably connected to the transceiver 1582 that includes a DHCP client 1590, and a network port 1588-1 operably connected to the transceiver 1582. The AS 356-1 includes a wired transceiver 1542, a controller 1544 operably connected to the transceiver 1542 that includes a DHCP client 1592, and network ports 1548-1, 1548-2 operably connected to the transceiver 1542. The AS 356-4 includes a wired transceiver 1552, a controller 1554 operably connected to the transceiver 1552 that includes a DHCP client 1594, and network ports 1558-1, 1558-2 operably connected to the transceiver 1542. The AP 360-3 includes a wired and wireless transceiver 1562, a controller 1564 operably connected to the transceiver 1562 that includes a DHCP client 1596, an antenna 1566, and a network port 1568 operably connected to the transceiver 1542. The wireless sensor 362-1 includes a wireless transceiver 1572, a controller 1574 operably connected to the transceiver 1572 that includes a DHCP client 1598, and an antenna 1576 operably connected to the transceiver 1542. The transceivers 1532, 1542, 1552, 1562, 1572, 1582 may be the same as or similar to the transceivers 932, 982 depicted in FIG. 9. The controllers 1534, 1544, 1554, 1564, 1574, 1584 may be the same as or similar to the controllers 934, 984 depicted in FIG. 9. The network ports 1538-1, 1538-2, 1548-1, 1548-2, 1558-1, 1558-2, 1568, 1588 may be the same as or similar to the network ports 938, 988 depicted in FIG. 9. The antennae 1566, 1576 may be the same as or similar to the antennae 936, 986 depicted in FIG. 9. In some embodiments, the DHCP server 1540 is configured to assign IP addresses and/or provide other network information (e.g., an IP address of a DNS server, an IP address of another network device (e.g., an intermediate device), and/or a cloud server address) to the DHCP clients 1590, 1592, 1594, 1596, 1598 and the DHCP clients 1590, 1592, 1594, 1596, 1598 are configured to request IP address and other information from the DHCP server 1540.

In some embodiments, routing in an NSB (e.g., the NSB 150 depicted in FIG. 1 or the NSB 350 depicted in FIG. 3) is achieved by the following mechanisms. An OSPF routing protocol runs on each distribution switch (DS) and each access switch (AS). An OSPF module on a DS may advertise the distribution switch loopbacks and the HE loopback IP addresses to a corresponding AS. An OSPF module on an AS may advertise the access switch loopbacks and access point loopbacks to a corresponding DS. An AS may learn the AP loopbacks by DHCP snooping the DHCP response to a corresponding access point. An OSPF module on an AS may also advertises the access switch loopbacks to other access switches in the ring. HEs and APs may not run OSPF and may have a default route pointing to corresponding DSs and ASs respectively. Each He may operate as an anchor for all wireless and wired clients in the NSB architecture. APs and APs may have GRE tunnels that terminate at corresponding HEs. All traffic from end-points connected to wired access switches and wireless access points are tunneled to a HE. A HE may advertise all end-point IP addresses using Generic Attribute Registration Protocol (GARP)/gRPC to a corresponding DS such that traffic received by the DS from an upstream router can be forwarded to the appropriate head-end where a client is anchored. In some embodiments, failure and error conditions during service bring up are notified to an operator (e.g., the operator 120 of the installer device 106) via a combination of LEDs on network elements and instructions on a mobile app of a device used by the operator. Once network services are automatically initiated for all network elements of the NSB, validation is performed for the NSB to make sure that the NSB configuration and topology are according to a planned design for the customer site.

Figure 16:
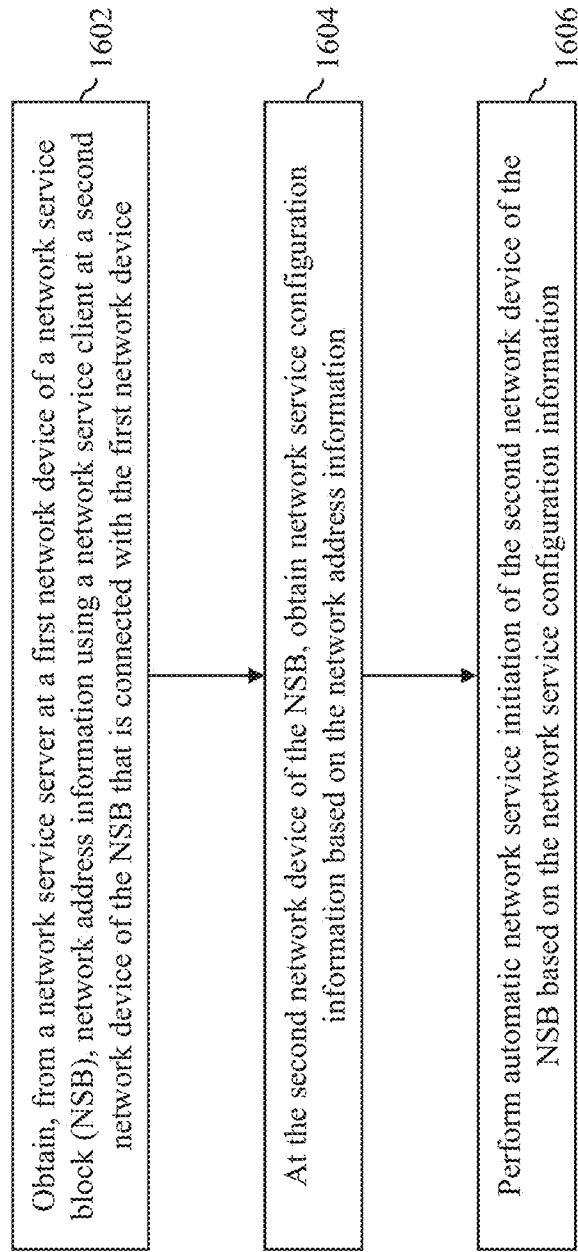
FIG. 16 is a process flow diagram of a method of automatic network service initiation in accordance to an embodiment of the invention.

FIG. 16 is a process flow diagram of a method of automatic network service initiation in accordance to an embodiment of the invention. According to the method, at block 1602, from a network service server at a first network device of an NSB, network address information is obtained using a network service client at a second network device of the NSB that is connected with the first network device. In some embodiments, the network address information includes a network address that is assigned to the second network device by the network service server at the first network device. In some embodiments, the network service server includes a dynamic host configuration protocol (DHCP) server, and the network service client includes a DHCP client. In some embodiments, the network address information includes an Internet Protocol (IP) address that is assigned to the DHCP client by the DHCP server. At block 1604, at the second network device of the NSB, network service configuration information is obtained based on the network address information. In some embodiments, the network address information includes address information of a cloud server, and the network service configuration information is obtained from the cloud server based on the address information of the cloud server. In some embodiments, the network address information further includes an IP address of a DNS server. At block 1606, automatic network service initiation of the second network device of the NSB is performed based on the network service configuration information. In some embodiments, automatic network service initiation of an open shortest path first (OSPF) service or a link layer discovery protocol (LLDP) service in the second network device of the NSB is performed based on the network service configuration information. In some embodiments, the first network device of the NSB includes a distribution switch. In some embodiments, the second network device of the NSB includes a gateway, an access switch, a wireless access point, or a sensor. In some embodiments, the NSB includes a pair of distribution switches, a pair of gateways that are connected to the distribution switches, a plurality of access switches that are connected to the gateways, a plurality of wireless access points (APs) that are connected to the access switches, and a plurality of wireless sensors that wirelessly connect to the wireless APs. The network service server may be similar to, the same as, or a component of the network service server 940 depicted in FIG. 9 and/or the DHCP server 1540 depicted in FIG. 15. The network service client may be similar to, the same as, or a component of the network service client 990 depicted in FIG. 9 and/or the DHCP clients 1590, 1592, 1594, 1596, 1598 depicted in FIG. 15. The NSB may be similar to, the same as, or a component of the NSB 150 depicted in FIG. 1 and/or the NSB 350 depicted in FIG. 3. The first network device may be similar to, the same as, or a component of the DSs 352-1, 352-2 of the NSB 350 depicted in FIG. 3, the network device 504 depicted in FIG. 5, the first network device 904 depicted in FIG. 9, and/or the DS 352-1 depicted in FIG. 15. The second network device may be similar to, the same as, or a component of the HEs 354-1, 354-2 of the NSB 350, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 depicted in FIG. 3, the second network device 954 depicted in FIG. 9, and/or the HE 354-1, the ASs 356-1, 356-4, the wireless AP 360-3, and/or the wireless sensor 362-1 depicted in FIG. 15.

The cloud server may be similar to, the same as, or a component of the cloud server 102 depicted in FIG. 1.

Figure 17:
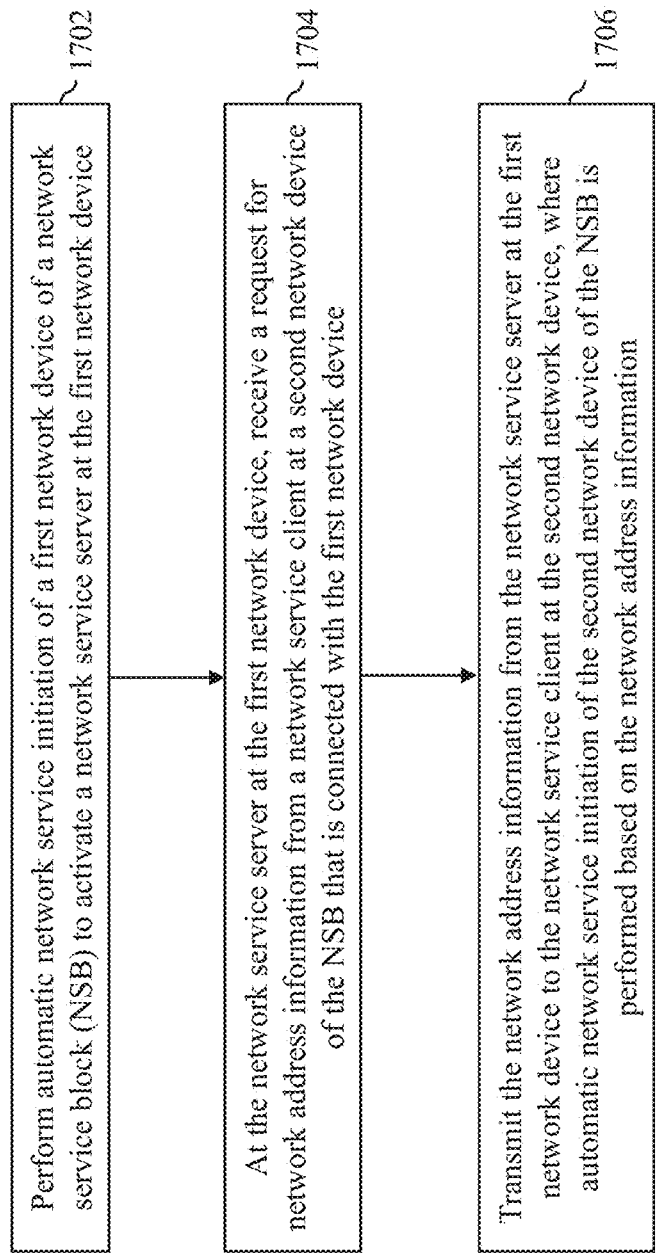
FIG. 17 is a process flow diagram of a method of automatic network service initiation in accordance to an embodiment of the invention.

FIG. 17 is a process flow diagram of a method of automatic network service initiation in accordance to an embodiment of the invention. According to the method, at block 1702, automatic network service initiation of a first network device of an NSB is performed to activate a network service server at the first network device. At block 1704, at the network service server at the first network device, a request for network address information is received from a network service client at a second network device of the NSB that is connected with the first network device. In some embodiments, the network service server includes a DHCP server, and the network service client includes a DHCP client. In some embodiments, the network address information includes an IP address that is assigned to the DHCP client by the DHCP server. In some embodiments, automatic network service initiation of a DHCP service, an open shortest path first (OSPF) service, and a link layer discovery protocol (LLDP) service in the first network device of the NSB is performed. At block 1706, the network address information is transmitted from the network service server at the first network device to the network service client at the second network device, where automatic network service initiation of the second network device of the NSB is performed based on the network address information. In some embodiments, the first network device of the NSB is paired with an installer device at a customer site to obtain first network service configuration information from the installer device. In some embodiments, automatic network service initiation of the first network device of the NSB is performed to activate the network service server at the first network device based on the first network service configuration information from the installer device. The network service server may be similar to, the same as, or a component of the network service server 940 depicted in FIG. 9 and/or the DHCP server 1540 depicted in FIG. 15. The network service client may be similar to, the same as, or a component of the network service client 990 depicted in FIG. 9 and/or the DHCP clients 1590, 1592, 1594, 1596, 1598 depicted in FIG. 15. The NSB may be similar to, the same as, or a component of the NSB 150 depicted in FIG. 1 and/or the NSB 350 depicted in FIG. 3. The first network device may be similar to, the same as, or a component of the DSs 352-1, 352-2 of the NSB 350 depicted in FIG. 3, the network device 504 depicted in FIG. 5, the first network device 904 depicted in FIG. 9, and/or the DS 352-1 depicted in FIG. 15. The second network device may be similar to, the same as, or a component of the HEs 354-1, 354-2 of the NSB 350, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 depicted in FIG. 3, the second network device 954 depicted in FIG. 9, and/or the HE 354-1, the ASs 356-1, 356-4, the wireless AP 360-3, and/or the wireless sensor 362-1 depicted in FIG. 15.

Figure 18:
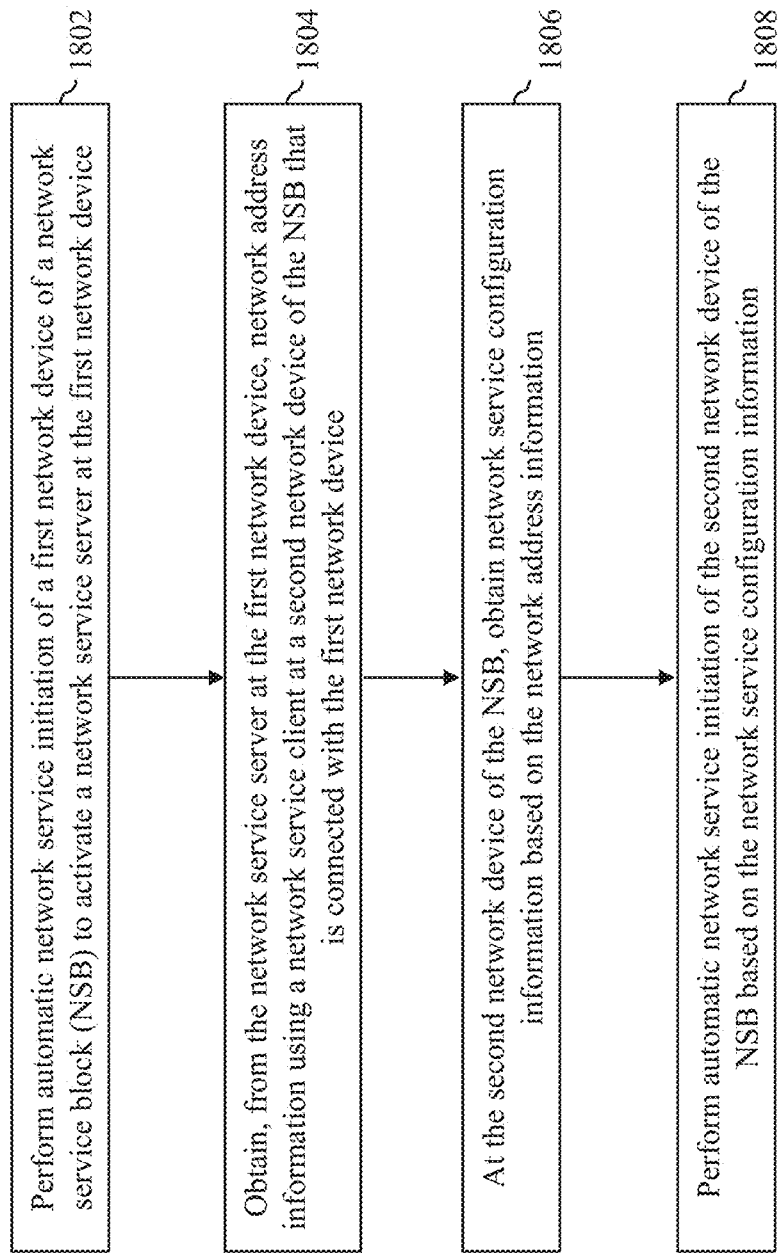
FIG. 18 is a process flow diagram of a method of automatic network service initiation in accordance to an embodiment of the invention.

FIG. 18 is a process flow diagram of a method of automatic network service initiation in accordance to an embodiment of the invention. According to the method, at block 1802, automatic network service initiation of a first network device of an NSB is performed to activate a network service server at the first network device. At block 1804, from the network service server at the first network device, network address information is obtained using a network service client at a second network device of the NSB that is connected with the first network device. In some embodiments, the network service server includes a DHCP server, and the network service client includes a DHCP client. In some embodiments, the network address information includes an IP address that is assigned to the DHCP client by the DHCP server. At block 1806, at the second network device of the NSB, network service configuration information is obtained based on the network address information. At block 1808, automatic network service initiation of the second network device of the NSB is performed based on the network service configuration information. In some embodiments, automatic network service initiation of an open shortest path first (OSPF) service or a link layer discovery protocol (LLDP) service in the second network device of the NSB is performed based on the network service configuration information. The network service server may be similar to, the same as, or a component of the network service server 940 depicted in FIG. 9 and/or the DHCP server 1540 depicted in FIG. 15. The network service client may be similar to, the same as, or a component of the network service client 990 depicted in FIG. 9 and/or the DHCP clients 1590, 1592, 1594, 1596, 1598 depicted in FIG. 15. The NSB may be similar to, the same as, or a component of the NSB 150 depicted in FIG. 1 and/or the NSB 350 depicted in FIG. 3. The first network device may be similar to, the same as, or a component of the DSs 352-1, 352-2 of the NSB 350 depicted in FIG. 3, the network device 504 depicted in FIG. 5, the first network device 904 depicted in FIG. 9, and/or the DS 352-1 depicted in FIG. 15. The second network device may be similar to, the same as, or a component of the HEs 354-1, 354-2 of the NSB 350, the ASs 356-1, 356-2, 356-3, 356-4, 356-5, 356-6, 356-7, 356-8, the wireless APs 360-1, 360-2, 360-3, 360-4, 360-5, 360-6, and/or the wireless sensors 362-1, 362-2, 362-3 depicted in FIG. 3, the second network device 954 depicted in FIG. 9, and/or the HE 354-1, the ASs 356-1, 356-4, the wireless AP 360-3, and/or the wireless sensor 362-1 depicted in FIG. 15.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of automatic network service initiation, the method comprising:
    obtaining, from a dynamic host configuration protocol (DHCP) server at a distribution switch of a network service block (NSB), first network address information using a first DHCP client at a gateway of the NSB that is connected with the distribution switch, wherein the first network address information comprises a first Internet Protocol (IP) address that is assigned to the gateway and a fully qualified domain name (FQDN) of a cloud server, and wherein the first network address information further comprises an IP address of a domain name system (DNS) server;
    at the gateway of the NSB, obtaining link layer discovery protocol (LLDP) service configuration information from the cloud server based on the first network address information;
    performing automatic network service initiation of an LLDP service in the gateway of the NSB based on the LLDP service configuration information;
    obtaining, from the DHCP server at the distribution switch of the NSB, second network address information using a second DHCP client at an access switch of the NSB that is connected with the distribution switch, wherein the second network address information comprises a second IP address of the access switch and the FQDN of the cloud server;
    at the access switch of the NSB that is connected to the distribution switch, obtaining LLPD and open shortest path first (OSPF) service configuration information from the cloud server;
    performing automatic network service initiation in the access switch based on the LLDP and OSPF service configuration information;
    at a downstream access switch of an access switch ring that includes the access switch, obtaining, from the DHCP server at the distribution switch of the NSB, third network address information through the access switch, wherein the third network address information comprises a third IP address of the downstream access switch and the FQDN of the cloud server, and wherein the downstream access switch is connected to the distribution switch via the access switch;
    at the downstream access switch, obtaining third service configuration information from the cloud server; and
    performing network service initiation in the downstream access switch based on the third service configuration information.

2. The method of claim 1, wherein the NSB comprises a pair of distribution switches, a pair of gateways that are connected to the pair of distribution switches, a plurality of access switches that are connected to the pair of gateways, a plurality of wireless access points (APs) that are connected to the access switches, and a plurality of wireless sensors that wirelessly connect to the wireless APs.

3. The method of claim 1, wherein the NSB further comprises at least one wireless access point (AP) that is connected to the access switch.

4. The method of claim 1, further comprising:
    at a wireless access point (AP) that is connected to the downstream access switch, obtaining, from the DHCP server at the distribution switch of the NSB, fourth network address information, wherein the fourth network address information comprises a fourth IP address of the wireless AP and the FQDN of the cloud server;
    at the wireless AP, obtaining fourth service configuration information from the cloud server; and
    performing network service initiation in the wireless AP based on the fourth service configuration information.

5. A method of automatic network service initiation, the method comprising:
    performing automatic network service initiation of a distribution switch of a network service block (NSB) to activate a dynamic host configuration protocol (DHCP) server at the distribution switch;
    at the DHCP server at the distribution switch, receiving a request for first network address information from a first DHCP client at a gateway of the NSB that is connected with the distribution switch, wherein the first network address information comprises a first Internet Protocol (IP) address that is assigned to the gateway and a fully qualified domain name (FQDN) of a cloud server, and wherein the first network address information further comprises an IP address of a domain name system (DNS) server;
    transmitting the first network address information from the DHCP server at the distribution switch to the DHCP client at the gateway, wherein link layer discovery protocol (LLDP) service configuration information is obtained at the gateway of the NSB from the cloud server based on the first network address information, and wherein automatic network service initiation of an LLDP service in the gateway of the NSB is performed based on the LLDP service configuration information;
    transmitting second network address information from the DHCP server at the distribution switch to a second DHCP client at an access switch of the NSB that is connected with the distribution switch, wherein the second network address information comprises a second IP address of the access switch and the FQDN of the cloud server, wherein LLPD and open shortest path first (OSPF) service configuration information is obtained at the access switch of the NSB from the cloud server, and wherein automatic network service initiation is performed in the access switch based on the LLDP and OSPF service configuration information; and
    transmitting third network address information from the DHCP server at the distribution switch through the access switch to a downstream access switch of an access switch ring that includes the access switch, wherein the third network address information comprises a third IP address of the downstream access switch and the FQDN of the cloud server, wherein the downstream access switch is connected to the distribution switch via the access switch, wherein third service configuration information is obtained at the downstream access switch from the cloud server, and wherein network service initiation is performed in the downstream access switch based on the third service configuration information.

6. The method of claim 5, further comprising pairing the distribution switch of the NSB with an installer device at a customer site to obtain first network service configuration information from the installer device.

7. The method of claim 6, wherein performing automatic network service initiation of the distribution switch of the NSB to activate the DHCP server at the distribution switch comprises performing automatic network service initiation of the distribution switch of the NSB to activate the DHCP server at the distribution switch based on the first network service configuration information from the installer device.

8. The method of claim 5, wherein the NSB further comprises at least one wireless access point (AP) that is connected to the access switch.

9. The method of claim 5, further comprising:
- transmitting fourth network address information from the DHCP server at the distribution switch to a wireless access point (AP) that is connected to the downstream access switch, wherein the fourth network address information comprises a fourth IP address of the wireless AP and the FQDN of the cloud server, wherein fourth service configuration information is obtained at the wireless AP from the cloud server, and wherein network service initiation is performed in the wireless AP based on the fourth service configuration information.

10. A method of automatic network service initiation, the method comprising:
- performing automatic network service initiation of a distribution switch of a network service block (NSB) to activate a dynamic host configuration protocol (DHCP) server at the distribution switch;
- obtaining, from the DHCP server at the distribution switch, first network address information using a DHCP client at a gateway of the NSB that is connected with the distribution switch, wherein the first network address information comprises a first Internet Protocol (IP) address that is assigned to the gateway and a fully qualified domain name (FQDN) of a cloud server, and wherein the first network address information further comprises an IP address of a domain name system (DNS) server;
- at the gateway of the NSB, obtaining link layer discovery protocol (LLDP) service configuration information from the cloud server based on the first network address information;
- performing automatic network service initiation of an LLDP service in the gateway of the NSB based on the LLDP service configuration information;
- obtaining, from the DHCP server at the distribution switch of the NSB, second network address information using a second DHCP client at an access switch of the NSB that is connected with the distribution switch, wherein the second network address information comprises a second IP address of the access switch and the FQDN of the cloud server;
- at the access switch of the NSB that is connected to the distribution switch, obtaining LLPD and open shortest path first (OSPF) service configuration information from the cloud server;
- performing automatic network service initiation in the access switch based on the LLDP and OSPF service configuration information;
- at a downstream access switch of an access switch ring that includes the access switch, obtaining, from the DHCP server at the distribution switch of the NSB, third network address information through the access switch, wherein the third network address information comprises a third IP address of the downstream access switch and the FQDN of the cloud server, and wherein the downstream access switch is connected to the distribution switch via the access switch;
- at the downstream access switch, obtaining third service configuration information from the cloud server; and
- performing network service initiation in the downstream access switch based on the third service configuration information.

11. The method of claim 10, wherein the NSB further comprises at least one wireless access point (AP) that is connected to the access switch.

12. The method of claim 10, further comprising:
- at a wireless access point (AP) that is connected to the downstream access switch, obtaining, from the DHCP server at the distribution switch of the NSB, fourth network address information, wherein the fourth network address information comprises a fourth IP address of the wireless AP and the FQDN of the cloud server;
- at the wireless AP, obtaining fourth service configuration information from the cloud server; and
- performing network service initiation in the wireless AP based on the fourth service configuration information.

* * * * *